(12) United States Patent
Moghaddam et al.

(10) Patent No.: US 7,516,219 B2
(45) Date of Patent: Apr. 7, 2009

(54) CONSUMER CONFIGURABLE MOBILE COMMUNICATION WEB FILTERING SOLUTION

(75) Inventors: Mehran Moghaddam, Gaithersburg, MD (US); Jonjie Sena, Gaithersburg, MD (US); Carlos Bernardino Eleazar Perez, Gaithersburg, MD (US)

(73) Assignee: Ventraq Corporation, Gaithersburg, MD (US)

( * ) Notice: Subject to any disclaimer, the term of this patent is extended or adjusted under 35 U.S.C. 154(b) by 0 days.

(21) Appl. No.: 12/018,079

(22) Filed: Jan. 22, 2008

(65) Prior Publication Data

US 2008/0114862 A1 May 15, 2008

Related U.S. Application Data

(63) Continuation of application No. 11/757,818, filed on Jun. 4, 2007, which is a continuation-in-part of application No. 11/516,576, filed on Sep. 7, 2006.

(60) Provisional application No. 60/842,703, filed on Sep. 7, 2006.

(51) Int. Cl.
 *G06F 15/173* (2006.01)
 *G06F 15/16* (2006.01)
 *H04M 1/00* (2006.01)

(52) U.S. Cl. .................. 709/225; 709/223; 709/229; 379/350

(58) Field of Classification Search ............. 709/223, 709/225, 229; 379/350
See application file for complete search history.

(56) References Cited

U.S. PATENT DOCUMENTS

| | | | |
|---|---|---|---|
| 5,611,050 A | 3/1997 | Theimer et al. | |
| 5,999,973 A | 12/1999 | Glitho et al. | |
| 6,161,139 A | 12/2000 | Win et al. | |
| 6,442,406 B1 | 8/2002 | Harris et al. | |
| 6,697,842 B1 | 2/2004 | Smith et al. | |
| 6,871,082 B2 | 3/2005 | Cox et al. | |
| 6,941,134 B2 | 9/2005 | White | |
| 7,181,513 B1 | 2/2007 | Harada et al. | |
| 7,194,464 B2 | 3/2007 | Kester et al. | |
| 7,197,321 B2 | 3/2007 | Erskine et al. | |
| 7,203,749 B2 | 4/2007 | Hiraga | |
| 7,206,803 B1 * | 4/2007 | Bendel et al. | 709/202 |

(Continued)

FOREIGN PATENT DOCUMENTS

EP 1 670 270 A1 6/2006

(Continued)

OTHER PUBLICATIONS darkReading Risky Business; "AppGate Adds Web Filter; AppGate has developed a way to secure and filter web traffic from smartphones by routing traffic through the AppGate server;" p. 1, Feb. 6, 2007, Stockholm. Copyright@2000 CMP Media LLC.

(Continued)

*Primary Examiner*—Kenny Lin
(74) *Attorney, Agent, or Firm*—Sonnenschein Nath & Rosenthal LLP

(57) ABSTRACT

Consumer configurable mobile communications solution enabling web filtering based on policy-enforcement services allowing authorized users to define, manage and enforce restrictions for mobile web data and services of a secondary mobile device.

20 Claims, 13 Drawing Sheets

U.S. PATENT DOCUMENTS

| | | | |
|---|---|---|---|
| 7,218,912 | B2 | 5/2007 | Erskine et al. |
| 7,263,076 | B1 | 8/2007 | Leibovitz et al. |
| 7,289,617 | B2 | 10/2007 | Barnes et al. |
| 7,298,835 | B1 | 11/2007 | Perry |
| 2002/0173339 | A1 | 11/2002 | Safadi |
| 2002/0184539 | A1* | 12/2002 | Fukuda et al. ............... 713/202 |
| 2003/0076941 | A1 | 4/2003 | Tiliks et al. |
| 2003/0081621 | A1 | 5/2003 | Godfrey et al. |
| 2003/0221011 | A1* | 11/2003 | Shitano ...................... 709/229 |
| 2004/0051733 | A1* | 3/2004 | Katzir ........................ 345/741 |
| 2004/0166878 | A1 | 8/2004 | Erskine et al. |
| 2004/0260801 | A1 | 12/2004 | Li |
| 2005/0096009 | A1 | 5/2005 | Ackley |
| 2005/0097595 | A1 | 5/2005 | Lipsanen et al. |
| 2005/0113130 | A1 | 5/2005 | Weinzierl |
| 2005/0125528 | A1 | 6/2005 | Burke, II et al. |
| 2005/0138416 | A1 | 6/2005 | Qian et al. |
| 2005/0245236 | A1 | 11/2005 | Servi et al. |
| 2005/0259618 | A1 | 11/2005 | Ahya et al. |
| 2005/0260973 | A1 | 11/2005 | Van de Groenendaal |
| 2005/0282559 | A1 | 12/2005 | Erskine et al. |
| 2006/0047634 | A1 | 3/2006 | Aaron et al. |
| 2006/0094400 | A1 | 5/2006 | Beachem et al. |
| 2006/0168186 | A1 | 7/2006 | Mathew et al. |
| 2006/0209809 | A1 | 9/2006 | Ellingham et al. |
| 2006/0242309 | A1 | 10/2006 | Damick et al. |
| 2006/0251229 | A1 | 11/2006 | Gorti et al. |
| 2006/0276226 | A1 | 12/2006 | Jiang |
| 2006/0280150 | A1 | 12/2006 | Jha et al. |
| 2006/0293057 | A1 | 12/2006 | Mazerski et al. |
| 2007/0055775 | A1* | 3/2007 | Chia .......................... 709/225 |
| 2007/0061211 | A1 | 3/2007 | Ramer et al. |
| 2007/0111726 | A1 | 5/2007 | Lambert et al. |
| 2007/0142041 | A1 | 6/2007 | Wood |
| 2007/0169169 | A1 | 7/2007 | Zheng et al. |
| 2007/0198834 | A1 | 8/2007 | Ksontini et al. |
| 2008/0009268 | A1* | 1/2008 | Ramer et al. ............. 455/412.1 |

FOREIGN PATENT DOCUMENTS

| | | |
|---|---|---|
| EP | 1 798 659 A1 | 6/2007 |

OTHER PUBLICATIONS

Sep. 9, 2007; "AT&T Rolls Out New Web-Based Parental Control Feature for Wireless Service;" pp. 1-2; Copyright 2007 Wireless News.

Yahoo! Tech; Advisors Daily, real-world advice without the jargon. Get Updates: Parental Control Options: Part 2, Thursday, Jan. 25, 2007; pp. 1-3.

Marcos Forte et al., "A content classification and filtering server for the Internet". SAC '06, Apr. 23-27, 2006, Dijon, France, pp. 1166-1171.

Sten A. Lundesgaard, et al., Service Plans for Context- and QoS-aware Dynamic Middleware; *Simula Research Laboratory*; Abstract, pp. 1-6, 2006.

Ram Gopal et al., Nokia Research Center, User plane Firewall for 3G Mobile Network, pp. 2117-2121, 2003.

Wolfgang Bohm et al., Munich Germany, "Policy Based Architecture for the UMTS Multimedia Doman", pp. 1-11, 2003.

VeriSign® Mobile Control Services; pp. 1-3, no date.

Ed Ogonek, "Parental Control in a Mobile Phone World"; WirelessWeek—Jun. 15, 2006; p. 1.

M.M. Mahmoud et al., "Evaluation of Rotor Conducting Screens on the Single-Phase Switched Reluctance Machine", p. 1; School of Engineering and Physical Sciences, Heriot-Watt University Riccarton, Edinburgh, Scotland, United Kingtdom, Feb. 2006.

Hua Wang et al., Department of Maths &Computing, University of Southern Queensland; Toowoomba, QLD 4350 Australia; Ubiquitous Computing Environments and Its Usage Access Control;: pp. 1-10; Jun. 2006.

Ron Shacham et al., Columbia University; "Ubiquitous Device Personalization and Use: The Next Generation of IP Multimedia Communications"; ACM Transactions on Multimedia Computing, Communications and Applications, vol. 3, No. 2, Article 12, Publication Date: May 2007; pp. 1-20.

Cisco Systems; Corporate Headquarters; Cisco Wireless IP Phone 7920 Release Notes for Firmware Release 2.0; Copyright 2005 Cisco Systems, Inc.. pp. 1-20.

Ashraf Khalil et al., Department of Computer Science, Indiana University, 150 W. Woodlawn Ave., Bloomington, IN 47405; "Context-aware configuration: A study on improving cell phone awareness;" pp. 1-13, no date.

"New Parental Control Gateway from ZyXEL Provides Easy Solution for Safe Home Internet Surfing", Business Wire. Wednesday, Jun. 30, 2004.

"ProQuent Unveils World's First Solution for Policing Mobile Content-ProQuent Access Mobile Enables Network Operators to Filter out and Control Access to Inappropriate, Indecent and Offensive Content", Business Wire. Tuesday, Feb. 17, 2004.

* cited by examiner

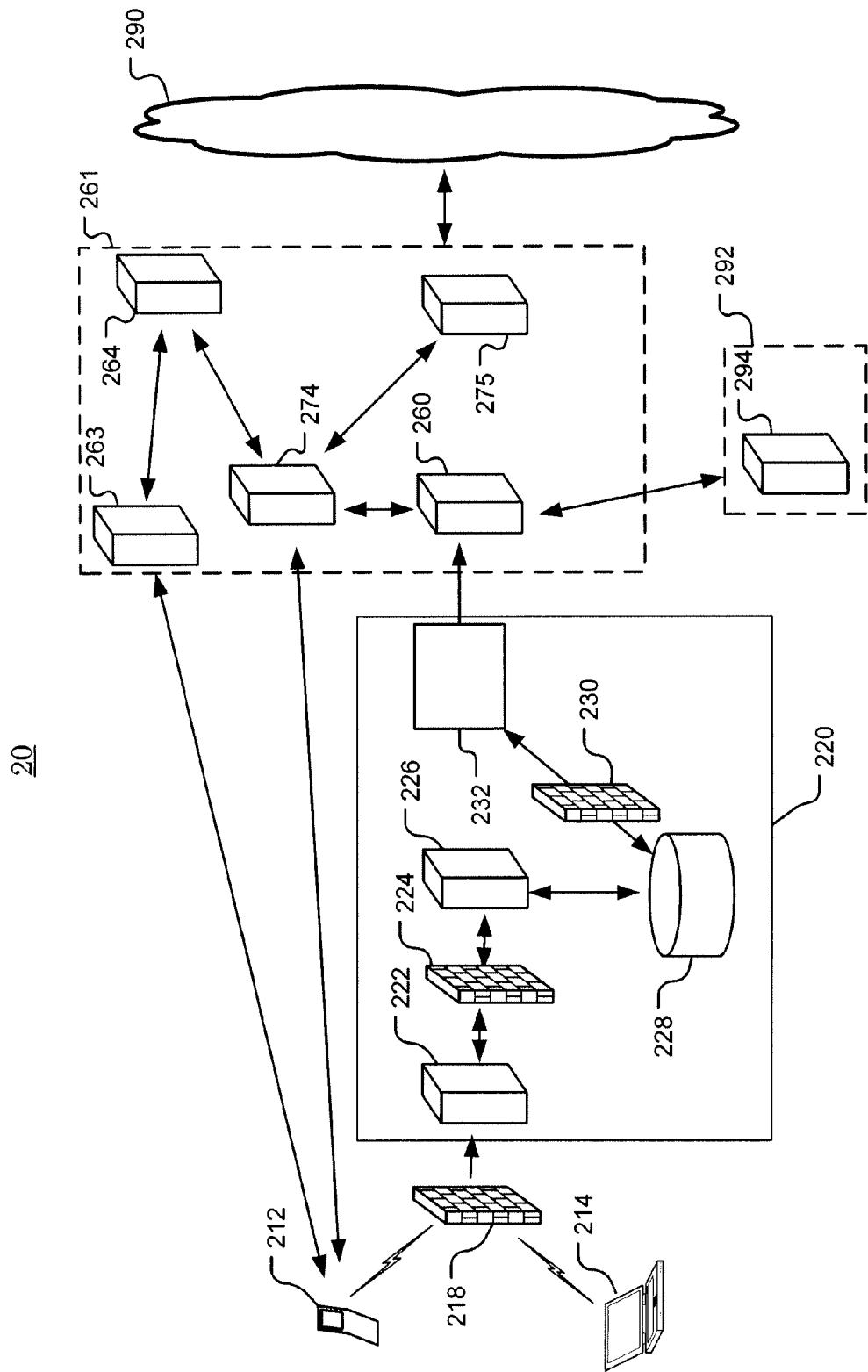

CONSUMER CONFIGURABLE MOBILE COMMUNICATION WEB FILTERING SOLUTION

CROSS REFERENCE TO RELATED APPLICATION

This application is a continuation application of U.S. patent application Ser. No. 11/757,818 filed Jun. 4, 2007, which application in turn is a continuation in part of U.S. Non-Provisional patent application Ser. No. 11/516,576 entitled "CONSUMER CONFIGURABLE MOBILE COMMUNICATION SOLUTION" and filed Sep. 7, 2006; and further claim the benefit of priority to U.S. Provisional Application 60/842,703 entitled "CONSUMER CONFIGURABLE MOBILE COMMUNICATION SOLUTION" and filed Sep. 7, 2006, which are hereby incorporated by reference.

BACKGROUND OF THE INVENTION

1. Field of the Invention

The present invention relates to a system and method for a consumer configurable mobile communication web filtering solution, and more particularly, to a system and method for configuring and using the usage criteria of one or more mobile communication devices by a user for filtering web content.

2. Discussion of the Related Art

Mobile communication devices have become prevalent in business and home use. Despite the abundance of devices, however, there are few ways of individually restricting the usage of each device or a group of devices within a master account. Typically it is left up to the individual carrying the device to use it as requested by a supervisor (e.g., a manager or parent) supplying the device.

Current methods of restricting mobile device usage include prepaid mobile plans or restricted handsets. A prepaid plan limits how often an individual can use a device; however, it does not restrict, for example, when or to whom a call is made, from whom a call is received, or what web or multimedia use is acceptable. The limits of a prepaid plan are also typically defined by a phone company, not the person owning or managing the phone. Furthermore, prepaid plans are typically managed as a single device, as opposed to a group plan where multiple devices would be obtained and managed under one account. Accordingly, each device is managed as a single account with its own bill and control over the device is limited to the user of the device's willingness to abide by rules set out by that user's supervisor.

Restricted handsets may also be used to limit mobile use. However, few such handsets are available on the market. Handsets that are currently available are typically geared toward very young users, which has earned them the commonly used title of "kiddie phones." Restricted handsets typically only allow a user to dial, and in some configurations receive calls from, specific phone numbers entered into the devices configuration. For example, a parent would typically enter specific phone numbers into the handset's password protected "phonebook." The child would then be able to dial only those numbers available in the phonebook. Such devices may not even have a dialing pad with which to call a specific number not available in the device's phonebook. Such a device would clearly have limited appeal to an adult and much less to a child as he or she grows older and becomes increasingly subject to the peer pressure of adolescence.

Additionally, there are no options to configure the device to allow calls to certain numbers on specified days or timeframes, or to limit calls to a specified talk time, for example. Furthermore, as the changes are made directly to the device, the phone must be present for any modifications to the phonebook.

Restricted handsets are also typically sold as temporary or "pay as you go" devices. As such, the device is typically not associated with a contract or account, thus limiting a supervisor's ability to review the time usage of the device. Time is simply added to the device through the purchase of refill cards or other time purchase mechanisms.

Furthermore, IP communication in general does not carry a mobile device's phone number. For example, mobile browsers typically do not include the number of the device in their HTTP headers. Only the mobile phone's IP address is typically present.

These and other deficiencies exist with conventional mobile communication systems and methods of operation. Therefore, a solution to these and other problems is needed, providing a user configurable system and method specifically designed to configure usage restrictions of one or more mobile communication devices, as well as provide a mechanism at the carrier's network to lookup the mobile phone number based on an IP address for filtering web content.

SUMMARY OF THE INVENTION

Accordingly, the present invention is directed to a consumer configurable mobile communication solution providing the ability to configure device usage restrictions for one or more mobile communications devices.

The present invention provides a system and method for configuring mobile web services for one or more mobile devices, such as cell phones, pagers, and wireless e-mail devices, for example, by a primary user of a mobile communications account containing the user devices. According to the present invention, one or more individuals would be identified as the primary users of the account, such as a parent in a family plan, or a manager in an enterprise plan, for example. According to an embodiment of the present invention, a primary user may configure usage restrictions, such as the time of day a device may be used, the phone numbers a device may call, the web services that may be accessed, or geographical limitations, among others, for the one or more secondary user devices by accessing a configuration interface. In a further embodiment, groups may be configured with usage restrictions, wherein devices may be assigned to the group inheriting the group's restrictions. The configuration interface may be a graphical interface via a network connection, a menu interface providing selections available via a telephone, or any other interface allowing configuration of the secondary user devices. Furthermore, configuration is dynamic allowing a primary user to make changes to a secondary user's device at anytime of day or night without the need for a device to be present.

According to a further embodiment, a consumer configurable mobile communications web filtering system is provided. The system includes a web filtering component for managing the use and access to network data by a secondary device and is operably connectable with a network providing the network data, such as the Internet or an Intranet. The web filtering component further includes a control module for receiving and storing configuration data containing configuration and policies for a secondary device and for enforcing the configuration and policies on the secondary user device.

Additional features and advantages of the invention will be set forth in the description that follows, and in part will be apparent from the description, or may be learned by practice of the invention. The objectives and other advantages of the invention will be realized and attained by the structure particularly pointed out in the written description hereof, as well as the appended drawings and appendices.

It is to be understood that both the foregoing general description and the following detailed description are exemplary and explanatory.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 2F shows a detailed view of a web filter architecture with multimedia messaging service ("MMS") capabilities for a consumer configurable mobile communications system, according to an embodiment of the present invention;

DETAILED DESCRIPTION OF VARIOUS EMBODIMENTS

Reference will now be made in detail to various embodiments of the present invention, examples of which are illustrated in the accompanying drawings.

Figure 1:
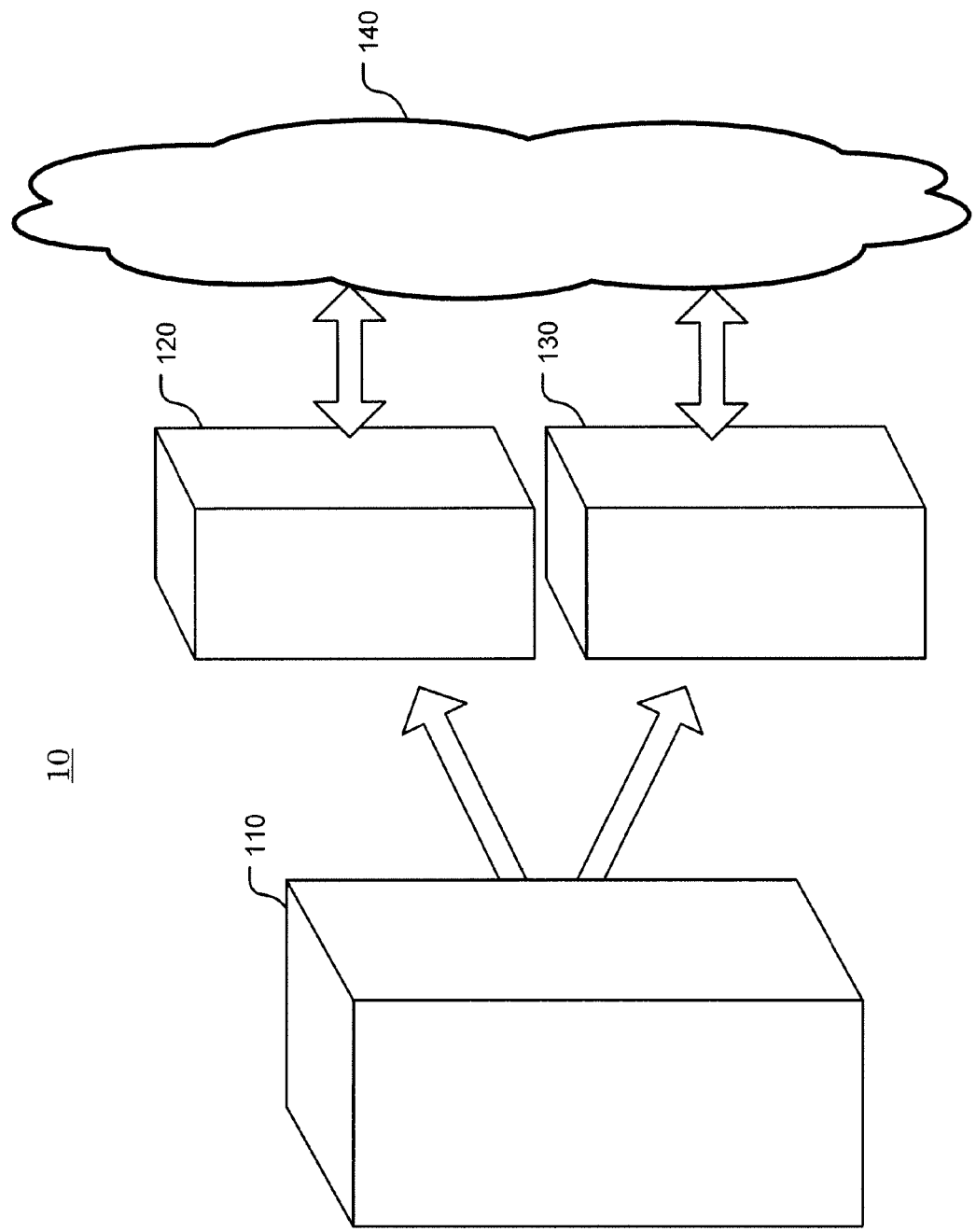
FIG. 1 shows a component view of a consumer configurable mobile communications system, according to an embodiment of the present invention.

FIG. 1 shows a component view of a consumer configurable mobile communications system, according to an embodiment of the present invention. Turning to FIG. 1, the configurable mobile communications system includes a patrol module 110, a control module 120, and a media module 130. According to one embodiment, the patrol module 110, control module 120, and media module 130 are servers configured to provide the functionality of the present invention. In further embodiments, the servers may be contained within a single physical computer server or distributed across a network.

The patrol module 110 provides a user interface, such as a web interface, to allow a primary user to access and configure device restrictions for secondary users associated with a group account including primary and secondary user devices. The patrol module 110 also provides a service management system (SMS) for forwarding configuration data to a control module 120 for updating service control point (SCP) devices used to enforce the user service policies over a signaling network 140, and thus determining how a call should be handled for a particular device. The patrol module 110 also maintains a master record for all configuration data for the user configurable mobile communications service provided by the present invention. The patrol module 110 also provisions other operation support systems (OSS) and network elements (NE), such as providing information to a home location register (HLR) and updating billing information, for example. The patrol module 110 is also responsible for generating reports and usage reports, such as call detail records, ratings, and various other reports. Furthermore, patrol module 110 provides administration capabilities, such as system administration, setting of privileges, and the adding of accounts, among others.

Control module 120 interconnects with and receives service management information from patrol module 110. Control module 120 provides SCP functionality, thus enforcing call control through the signaling network 140 based on the service management information received from patrol module 110. Call control may include allowing or blocking calls, or routing special requests to service nodes (SN) or through an intelligent peripheral (IP).

Protocols used for call control enforcement may differ in various embodiments depending on the type of mobile network used. For example, in pre-Intelligent Network (IN) mobile networks, call control may be implemented via ISDN User Part (ISUP) protocol or Release Line Trunking (RLT) over an SS7 network. For CDMA mobile networks, call control may be implemented via Wireless Intelligent Network (WIN) protocols over an SS7 network. In GSM mobile networks, call control may be implemented via Customized Applications for Mobile networks Enhanced Logic (CAMEL) over an SS7 network. Call control for IP and next generation mobile networks using IP Multimedia Subsystem (IMS) may be implemented via Session Initiation Protocol (SIP) over an IP network. In older IP networks, H.323 may also be used. Call control for other converged networks may be implemented via OSA/Parlay over an IP network. It will be clear to one skilled in the art that as technology changes, other protocols may be used. However, the service specification of the present invention is independent of the underlying call control protocols in use.

Media module 130 interconnects with patrol module 110 and provides interactive voice response (IVR) service or other information services, such as text or multi-media messages, to a mobile device using the services provided by the present invention on the signaling network 140, thus creating an intelligent peripheral. The media module 130 provides device or account information to alert the user of the device of restriction issues or other service information. For example, in one embodiment, IVR services announce low credit, restricted time or number information, among other notifications. According to various embodiments, information or service announcements provided through the media module 130 may be sent to a primary or secondary user's device, or both. In a further embodiment, an IVR self-care service may be provided to a device to allow the user to interact with the service, thus enabling various maintenance services.

Figure 2A:
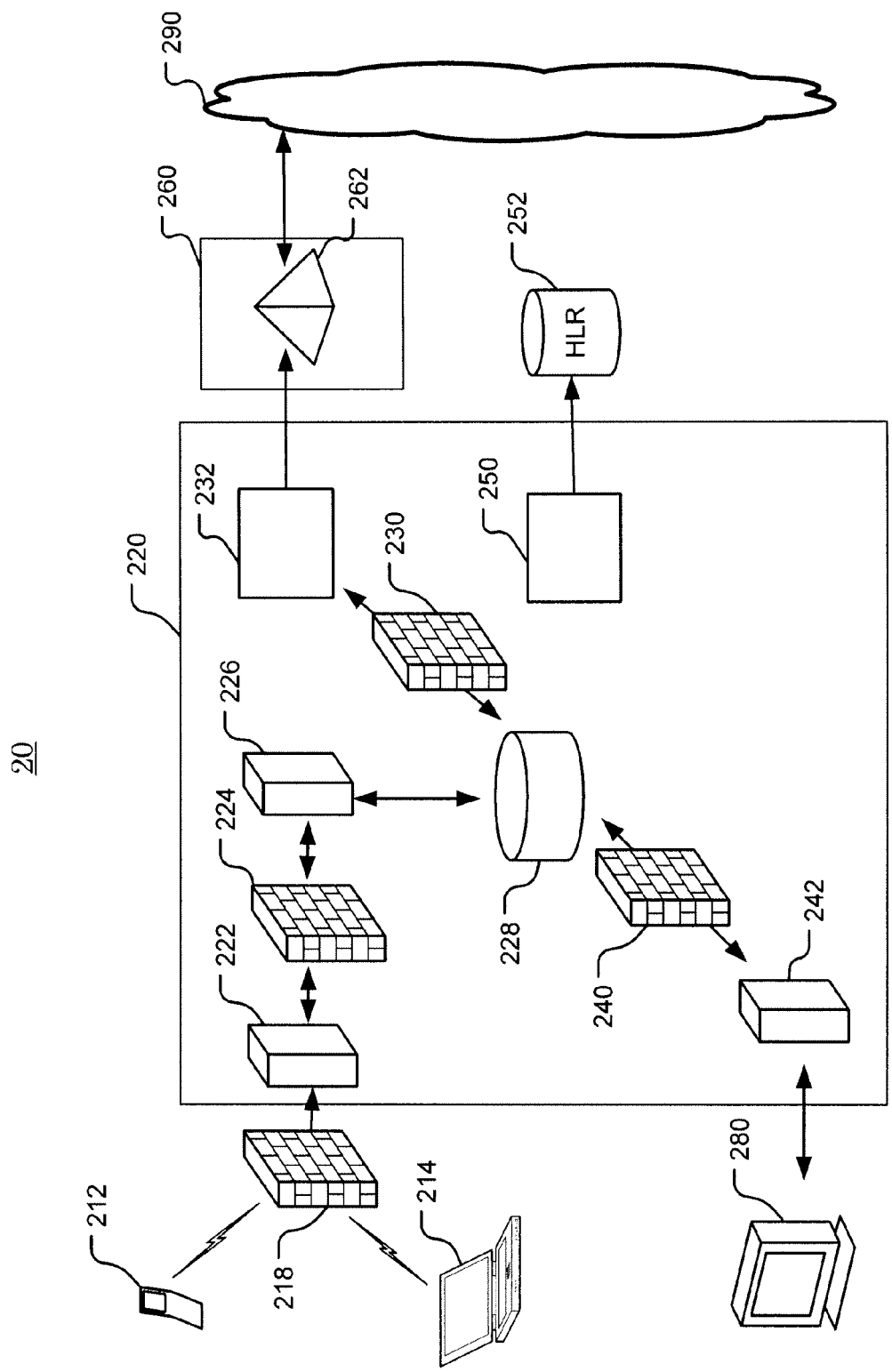
FIG. 2A shows a detailed view of a system providing a consumer configurable mobile communications system, according to an embodiment of the present invention.

FIG. 2A shows a detailed view of a system providing a user configurable mobile communications system, according to an embodiment of the present invention. System 20, as shown in FIG. 2A, includes a patrol module 220 and control module 260. A primary user may interconnect with patrol module 220 via any communications device configured to access patrol module 220, such as mobile phone 212 or computer 214, through a network connection. Through this connection a primary user is able to configure secondary devices included in their mobile communications account or add secondary devices to their account. In a further embodiment, the primary user may add one or more devices to the primary user's account.

In a further embodiment, a primary user's configuration activity is logged to assist a customer service representative in with any future intervention. For example, whenever a primary user logs in the date, time, and login name are recorded. Whenever a primary user makes changes to the configuration, the date and time, login name, function performed (e.g., added time period, deleted contact, etc) is logged.

According to an embodiment of the present invention, a customer service representative may also interconnect with patrol module 220 via any communications device configured to manage a primary user's account, including secondary devices associated with the account, such as customer service access point 280. According to the embodiment shown in FIG. 2A, customer service access point 280 interconnects with the patrol module 220 through customer service applications server 242. Customer service access point 280 allows the customer service representative to assist a primary user with any issues that may occur with the primary user's account. Customer service applications server 242 provides customer service applications through the customer service access point 280, which may be used to modify a user's account or data. In a further embodiment, the customer service representative may add one or more devices to the primary user's account.

In a further embodiment, the present invention logs changes made through a customer service representative. For example, whenever an account is created, deleted, or modified the date, time, login name, and account holder information, such as the primary user's mobile number are logged. Whenever a secondary user is added to or deleted from an account the date, time, login name, account holder information, and secondary user information, such as the secondary user's mobile are logged. Whenever a customer service representative makes changes to a primary user's configuration, the date, time, login name, and function performed (e.g., added time period, deleted contact, etc) are logged.

According to an embodiment of the present invention, configuration of the secondary devices includes identifying what phone numbers and other services may be accessed, what time specified phone numbers and other services may be accessed. In a further embodiment, a customer console is provided by the patrol module 220 for the use of the primary user. This interface allows authorized users to manage the restrictions of the secondary users within an account. The customer console is intended for primary users, who are authorized to manage the settings for all users within the account. However, in a further embodiment, secondary users may also have access to the customer console in a read-only mode.

The customer console interface allows authorized personnel to perform the account management operations, such as assign nicknames to the different secondary users; manage time-based restrictions, such as specifying when a secondary user is able to use a particular service; manage usage-based restrictions, such as specifying how much usage a secondary user is able to use a particular service; manage allowed and disallowed parties, such as specifying who can always be called ("white-list") and who can never be called ("black-list"); assigning restrictions to the different secondary users; designate whether a subscriber is a primary user or secondary user; and creation and manage notifications.

In a further embodiment, group and hierarchical management is also provided. In such an embodiment, one or more groups are configured with specific rights and restrictions and secondary user may be assigned to a particular group, thus inheriting the rights and restrictions of the group.

In a further embodiment, geographical limitations may also be available to limit a secondary device's functionality when it is located in specified locations. For example, a primary user may configure a secondary user's device to limit the locations from which or to which a call may be placed. According to various embodiments, such limitations may be made based on an area code or the physical location of the device based on GPS data provided by the device.

In further embodiments of the present invention, a primary user may also restrict web, e-mail, and messaging functionalities in a similar manner. For example, web access may be restricted to specified times or to specified content or web address designations entered by the primary user. E-mail and messaging may be limited to specified times, as well as a specified list of addresses According to another embodiment of the present invention, an administrative console is also provided by the customer service application server 242 through the customer service console 280 for use by a customer service representative working for a service provider. This interface allows authorized personnel to perform various administrative operations, such as the management of customer logins, including new user access and password assignment; the management of primary accounts, including adding, deleting, or modifying an account; and the management of secondary users within a primary account, such as adding or deleting a secondary user.

The administrative console and customer console may be accessed via a variety of mechanisms. For example, web server 222 may provide a customer console and customer service applications server 242 may provide an administrative console. In one embodiment, accessing the management consoles is via web-based GUIs. In such an embodiment, the consoles are designed as web portlets intended for inclusion into a carrier's web portal. This allows the user interface to be made available to users within the existing electronic self-care provided by the carrier for other services. The web portlet may offer assistance in the form of user tips, bubble help, or context-sensitive help in order to assist the user in configuring the account settings.

According to one embodiment, the primary user may use the web interface to assign a name to each secondary user; assign restrictions to each secondary user, such as create and manage white-lists, create and manage blacklists, create and manage time periods, and create and manage usage limits; create contact list for use in white-lists and black-lists, and create time period list for use when managing restricted time periods.

According to a further embodiment, a customer service representative may use a web interface to add, delete and manage accounts; add, delete and manage secondary users within an account; access to a customer console to assist a primary user.

Returning to FIG. 2A, the patrol module 220 provides an instance of the consumer console via web server 222 and may be accessed by a graphical user interface with user device 212 or 214. Communication between patrol module 220 and user device 212 or 214 is monitored by firewall 218 to protect patrol module 220 from destructive communications inadvertently or intentionally sent via user device 212 or 214. According to the embodiment shown in FIG. 2A, after passing through firewall 218, communication from user devices 212 or 214 enters the patrol module 220 through web server 222.

According to an embodiment of the present invention, the primary user may configure time and usage restrictions, or make unrestricted designations. Time period restrictions restrict secondary users from using services within particular time periods. Each service can be restricted independently. By default, a subscriber has no time restrictions defined when first created. There is no limit to the number of time restrictions that may be set.

According to an embodiment of the present invention, a time range is specified by identifying the start and end time for the period. Nicknames may be assigned to these time ranges (e.g., "school hours") to simplify configuration. Time ranges are restricted within a given day, to allow for repeating time ranges across the weekdays, weekends, or all days. Time ranges that span days (e.g., from Monday 8:00 pm to Tue 7:00 am) are input as two time intervals.

Time ranges apply to a particular day, or grouping of days. The user may select from Day of Week (i.e., Sunday, Monday, etc), Weekday, Weekend or All. In one embodiment, calls that start during allowed time periods are automatically terminated if they cross into a restricted time period. In a further embodiment, notifications may be set to warn a user of a pending termination. For example, a five-minute warning may be given five minutes before entering a restricted time period. In a further embodiment, all times are interpreted as the local time zone of where the subscriber's home network location. The time specifications take into account daylight savings adjustments. However, it is acceptable that calls in progress when the daylight savings adjustment occurs may consider only the restrictions in place at the time of the call. (i.e., it does not have to account for daylight savings during the life of the call).

In further embodiments, secondary users may be restricted to using services within a specified usage allowance. These usage limits are defined on a per-service basis. Each service may use different limit units. For example, voice calls are limited in terms of minutes of phone use; text messages and e-mail are limited in terms of the number of messages. Usage limits may be completely independent of the calling plan minutes. In one embodiment, usage limits may be modified as needed by the primary user without restriction. This means that a primary user may add, subtract or zero out usage limits to impact a secondary user's usage. Changing usage limits does not affect the periodic limits (allowance).

As each service is used, the usage allowance is decremented based on usage. Warning messages are played when the usage reaches low thresholds. In general, usage limits are not adjusted whenever a call is disallowed. The following table shows how the usage limits are treated for successful calls, according to an embodiment of the present invention:

| Event/Restriction Type | Adjustment Specification |
| --- | --- |
| Outgoing call while the "unrestricted" indicator is enabled | Unaffected |
| Outgoing call to a whitelist number | Unaffected |
| Outgoing call to an unlisted number | Decremented |
| Incoming call while the "unrestricted" indicator is enabled | Unaffected |
| Incoming call to a whitelist number | Unaffected |
| Incoming call to an unlisted number | Decremented |

An embodiment of the present invention also provides an auto-replenishment function. In such an embodiment, a secondary user may be assigned a per-service attribute defining what the initial value is, as well as how often the value is reset. Reset intervals are defined monthly on an anniversary date (e.g., 200 minutes every $15^{th}$ of the month), or weekly on a particular day of the week (e.g., 50 minutes every Sunday).

Each secondary user is assigned a usage limit defined on a reset interval (either weekly or monthly). If a new reset interval is reached, and there is still a balance in the usage allowance, there is a question as how to deal with this balance. Is it discarded (i.e., "use or lose") or is carried over into the next interval ("rollover"). For flexibility, an embodiment of the present invention may also provide a rollover facility. In one embodiment the rollover facility provides the following:

| Field | Value | Comment |
| --- | --- | --- |
| Reset interval | Either weekly or monthly | When values are reset |
| Reset anniversary | For monthly resets date of month For weekly resets day of week | Anniversary of when values reset |
| Initial Value | | Value assigned at the start of each reset interval |
| Rollover maximum value | | Amount of remaining balance that is added to next interval. Anything over this maximum value is lost. To disallow rollovers, set this value to zero (0). |

In further embodiments of the present invention, a primary user may restrict usage to specified contacts. A blacklist is a list or register of people who, for one reason or another, are being denied contact. Names and numbers on the blacklist are not allowed to be contacted. Similarly, some numbers may be designed as always reachable. These numbers may be used for emergency contacts, including the primary user, for example. Names and numbers on the white-list are always allowed to be contacted, even during restricted times, or when the usage limits are exceeded. In one embodiment, calls to/from a white-listed number do not decrement the usage allowance. In a further embodiment, the present invention would always allow white-listed calls and block blacklisted calls, whether they are outgoing and incoming calls. In a further embodiment, numbers not present on either the white-list or blacklist are allowed, but subject to other restriction definitions (e.g., time periods, usage limits, etc). Contacts (i.e., phone numbers) cannot be listed on both the white-list and the blacklist simultaneously.

In a further embodiment, nicknames may be assigned to mobile phone numbers in a contact list (e.g., "Mom," "Dad," "Grandma") to simplify populating the blacklist and white-lists. A defined contact need not be present in either the blacklist or the white-list.

According to further embodiments, an "unrestricted" setting will override all settings for a particular secondary user without having to change any of the current restrictions and allowing the primary user to re-enable them at a subsequent time. In a further embodiment, usage limits are unaffected if the subscriber is designated as unrestricted.

The order in which restrictions are implemented may result in some settings overriding other restrictions. The following order of evaluation is used in one embodiment to determine whether services are allowed or blocked.

| Priority | Restriction | Comment |
| --- | --- | --- |
| 1. | Unrestricted subscriber designation | Subscribers who are classified as unrestricted are treated as if they have no restrictions. |
| 2. | White list designation | Numbers listed in the white list may be reached even if it is a restricted period, or usage limits have been exceeded. |
| 3. | Black list designation | Numbers listed in the blacklist are never reachable. |
| 4. | Time | |
| 5. | Usage | |
| 6. | Content filter | For data services only |

Returning to FIG. 2A, configuration information provided by the user through the user interface is then passed through firewall 224 to applications server 226. Applications server 226 provides the applications and services associated with the patrol module 220, including device configuration, reporting, billing, and system administration. Applications server 226 interconnects with patrol database 228. Patrol database 228 maintains a master record of all configuration information for the patrol module 220 and provides data to the applications server 226, service management systems module 232, and customer service application server 242.

Data transferred between patrol database 228 and service management module 232 moves through firewall 230. Data transferred between patrol database 228 and the customer service applications server 242 moves through firewall 240. Firewalls 230 and 240 protect patrol database 228 from malicious or corrupt information passed by the service management module 232 or customer service applications server 242 to protect the security and integrity of these elements of the patrol module 220.

Service management module 232 provides service management system functionality and is responsible for updating the service control point ("SCP") 262 located within control module 260. Service management module 232 provides network control information to SCP 262 based upon the configuration data provided through the customer console or the administrative console. In turn, the SCP 262 provides service delivery and network control for the devices managed by the primary user and used over communications network 290. Accordingly, the user devices function according to the configuration data maintained in the SCP 262 of the control module 260.

In the embodiment shown in FIG. 2A, the SCP is the network element that receives the triggers from the switch. Patrol module 220 and services management module 260 enforce the configuration as defined by the primary user for managing the usage of secondary user devices managed by the primary user. The functional responsibilities for an SCP according to an embodiment of the present invention are summarized below:

| Title | Definition | Comment |
| --- | --- | --- |
| Network Attachment | SS7 Point Code in the carriers network | Provides SS7 signaling, triggers and event interfaces |
| Trigger Processing | Receives TCAP messages that are triggers at certain decision points in the call flow. | |
| Event Processing | Sends "events" to notify the switch that a call state should be changed. | Initiated by a message from the Policy Component. |
| Signaling Error Recovery | SS7 error processing | SS7 fault tolerance, fail over, etc. to achieve required level of availability |
| Message Error Recovery | Error recovery due to loss of protocol or other problems in the message traffic or interface to the Policy Component | Message level re-connection, retransmission and re-establishment of context |
| Signaling Component Management | Command and control of the Signaling component itself | Monitoring, restart, shutdown, reconfigure, etc. as requested by the operations staff |
| Active Subscriber State Management | High-level context for each of the active connections. May involve some DB interaction. | The Policy Component maintains historical or "not active" state. |
| Logging and recording | Post to audit, activity and debug logs | Audit records are stored in the database, others written locally. |

Returning to FIG. 2A, provisioning module 250 updates the information stored on the home location register ("HLR") database 252 for each account. The HLR database 252 maintains subscriber information, such as address, account status, and user preferences, for a mobile communications system.

Figure 2B:
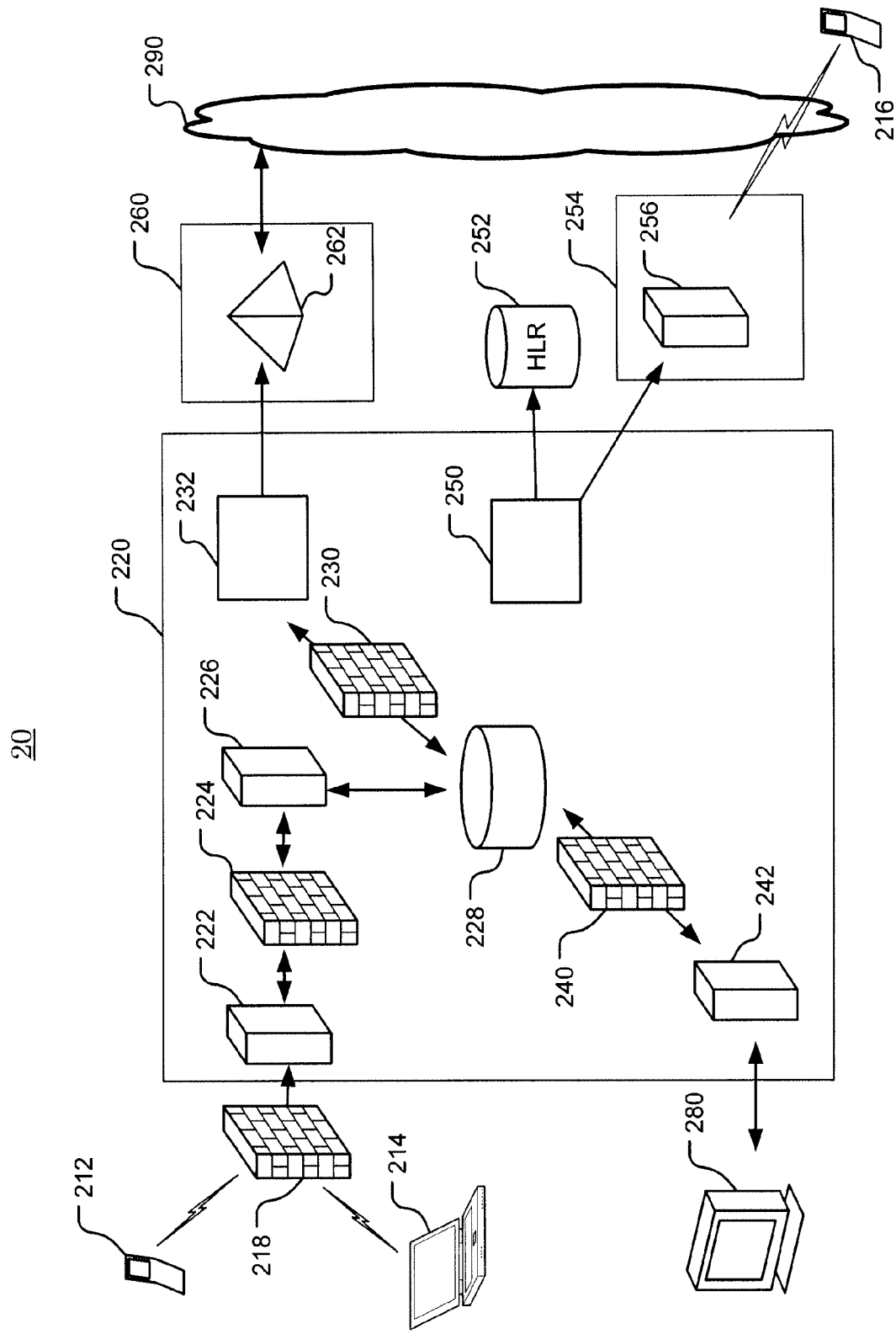
FIG. 2B shows a detailed view of a system providing a consumer configurable mobile communications system including media provisioning, according to an embodiment of the present invention.

FIG. 2B, shows a detailed view of a system providing a consumer configurable mobile communications system with media provisioning, according to an embodiment of the present invention. In FIG. 2B, provisioning module 250 interconnects with and provides information to media module 254. Media module 254 receives information from the provisioning module 250 allowing the media module 254 to interact with customer devices and provide a variety of account and device information.

According to one embodiment of the present invention, media module 254 includes an Interactive Voice Response ("IVR") server 256 acting as an intelligent peripheral. Various embodiments of the IVR server 256 support IVR features, DTMF processing, automatic speech recognition ("ASR"), and speech to text/text to speech capabilities, among others. According to one embodiment, IVR features supported by the IVR server 256 include self-care functionality allowing a user to access device accessible maintenance services. Announcements to user devices, such as low credit, restricted times or numbers, may also be provided through the media module 254. In further embodiments, the primary user is able to obtain or set the current balance for any secondary account or set or remove an unrestricted flag for any secondary account.

In further embodiments an ASR interface is provided to allow users to access the management interfaces using existing phones. The IVR plays back menu choices over the phones, and customers can configure the application by speaking responses over the phone. The ASR interface implements the same management options as the IVR interface, but adds speech as the primary user interface rather than touch tones.

In further embodiments, announcements are provided by media module 254. Announcements are audio recordings that are played back during voice calls to inform the affected user of the actions being taken according to a device's current configuration. In one embodiment, the secondary user is the only device to receive such announcements.

Postpaid and prepaid account may be handled differently. For example, in an embodiment providing postpaid accounts, the managed minutes are associated with the account. When a postpaid threshold is reached (i.e., exceed the total free minutes), a recording indicating that the free minutes has been exceed is played, but the call is allowed to continue. In an embodiment including prepaid accounts, if a call is within the limits of the account settings, but the prepaid account runs out of minutes, nothing is done. The prepaid platform is responsible for detecting this condition and terminating the call. In effect, the present invention is not concerned with changes in the prepaid calling balance.

In a further embodiment, a notification is transmitted to a subscriber to inform them of a significant event. This notification occurs outside of the actual call. For example, a low usage allowance, a zero usage allowance, low total usage limit, a blocked outgoing call, or a blocked incoming call may result in a notification. Notifications may be transmitted to a user-defined contact point. Contact points can be an SMS mobile phone number or an email address.

While it is possible to notify the primary user of each of these events as soon as it is detected, it is probably more appropriate/more convenient to provide a summary notification at the end of each day. In a further embodiment, the same information is made available in the audit logs. This may be provided to the primary user via the web portal.

In further embodiments, each attempted call or session may be recorded on a per-user basis. These are saved to a database and made available to primary users. This allows the user to view a detailed history of calls per user. In the case of blocked calls, these may be the only source of data, because most switches are not configured to generate CDRs when a call is blocked. In such embodiments, a usage record may contain the calling number, the called number or destination URL, the start time, the end time, the type of service {Voice, SMS, MMS, GPRS, WAP, etc.), the call termination status {Normal, Denied Time Period, Denied Zero Balance, Denied Blacklist, Denied Content, Terminated Time Period, Terminated Zero Balance, etc.)

In operation, a primary user may login to their account through a computer device, such as a phone 212 or computer 214. Once logged in, a primary user may view and configure the list of the secondary users associated with the primary users account, view and configure blocked time periods by adding, deleting, or modifying time periods for all secondary users within the account, view and configure a master contacts list by adding, deleting or modifying the information contained in the master contacts list, and view and configure restrictions for specific secondary users. For example, a primary user may view current restrictions placed on a specific device, as well as configure or modify the restrictions on that device. Such restrictions may include time or location limits placed on the device, a blocked time list, an always allow list, or a never allow list.

In a further embodiment, secondary users may be provided with limited access to make modifications to call lists, for example. In such an embodiment, a salesperson may add a new sales contact to their contact list. According to a further embodiment, the new contact information would need to be associated with a project code. In turn, the salesperson's manager would manage the specific restrictions associated with that project code.

In another embodiment of the present invention, geographic limitations may also be configured. For example, a device may be configured to place or receive calls only within a specified area code or country code. In a further embodiment, a device may be configured to place or receive calls only while the device is within a specified area or country code. In another embodiment, a device may be configured to place or receive calls only while the device is within a specified geographic area as defined by GPS coordinates.

Time period definitions may also be set on various restrictions assigned to a specific device. For example, a time period of a week or a month may be designated for various restrictions, such as call or messaging time. Accordingly, a primary user may designate a specific number of minutes allowed for calls during that specified time period. The primary user may also designate the anniversary date, or day within the selected time period that the restriction is reset. For example, a primary user may designate 15 minutes of call or messaging time for use per week and the allotted minutes are to be reset on Sunday. In a further example, a primary user may allot 60 minutes of call or messaging time for use per month wherein the reset date would be the first of the every month. A primary user may also designate rollover limits to allow a specified number of unused minutes to be added to the following months allotment of minutes.

In a further embodiment, a customer service representative, such as an employee or other designated individual or automated mechanism from the wireless operator providing access to the configuration system of the present invention, may create a new account or modify an existing account for a primary user. According to one embodiment of the present invention, a secondary user may only be added by the customer service representative. According to one embodiment, the customer service representative may login in to an account management system. Once in the account management system, the customer service representative may locate an existing account or add a new account. Once an account is available, the customer service representative may edit or delete information associated with the account, such as a primary user's address, phone number, or e-mail address, for example. The customer service representative may also add or modify the list of secondary users identified with the account. Once a secondary user is added to the account, the primary user may modify the restrictions to that secondary user as described above.

Figure 2C:
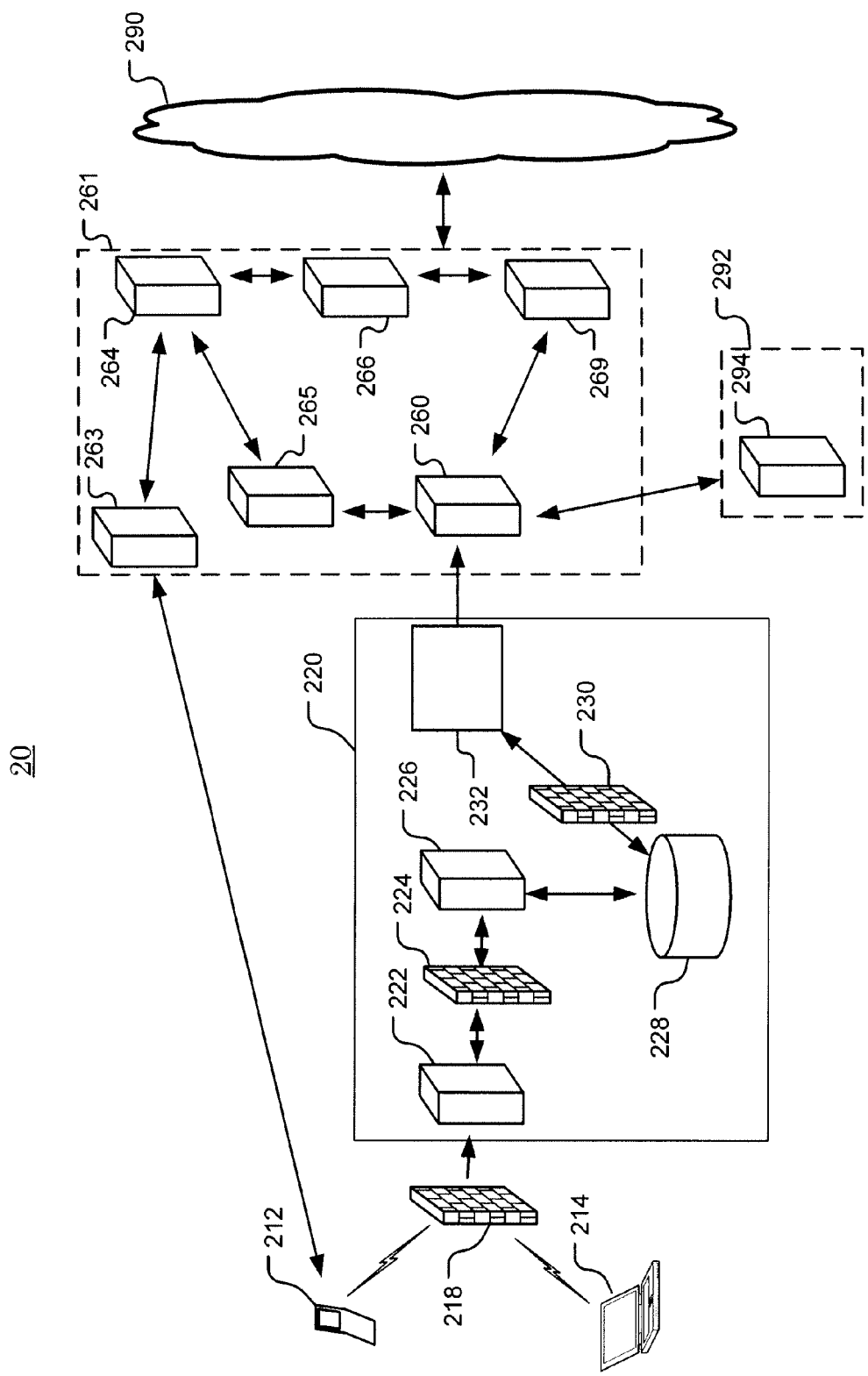
FIG. 2C shows a detailed view of a system providing a consumer configurable mobile communications system including web filtering, according to an embodiment of the present invention.

FIG. 2C shows a detailed view of a web filter architecture for a consumer configurable mobile communications system, according to an embodiment of the present invention. As discussed above, the present invention provides a primary user with the ability to control mobile access within the primary user's group of mobile devices. Control over these devices includes calling capabilities, as well as Internet access capabilities. For example, a primary user may control access by mobile devices within the primary user's group to specific websites, categories of websites, time of day access, and internet communication capabilities. Primary users are able to define these controls using the same user interface for defining voice access restrictions, as described above.

For mobile web filtering, the identification of the user in the form of a mobile phone number for each service control point involved in filtering is necessary. Web filtering, according to various embodiments of the present invention, may be based on three mechanisms. The first is a lookup mechanism that returns an MSISDN/MDN in response to an IP address. The second mechanism allows all outbound HTTP requests to be intercepted, inspected, and processed. The third is a categorization mechanism to determine a category for a given URL.

The embodiment of the present invention shown in FIG. 2C, provides web filtering components 261 within system 20 that include a control module 260, a Serving GPRS Support Node ("SGSN") module 263, a Gateway GPRS Support Node ("GGSN") module 264, a web filter module 265, such as an HTTP proxy server or other web filtering mechanism, a directory service module 269, and an authentication, authorization, and accounting ("AAA") services module 266. As previously discussed, control module 260 is responsible for enforcing the configuration and policies defined by the service management module 232 and communicated to the control module 260 with configuration data. In web filtering operations control module 260 is responsible for determining if a user may access a specific URL or other web based data and signaling the appropriate web filter to allow or deny such a request.

Control module 260 may base its determination on several factors, as configured by a primary user, such as time of day, as well as the category of a URL, or data to be accessed. According to one embodiment, a URL category is controlled through the control module 260. In such an embodiment, control module 260 includes a categorization interface for interconnecting with one or more content classification services 294 from within a set of third-party service providers 292. Content classification services 294 may contain standard or customized classification data. In further embodiments, additional interfaces may be implemented in control module 260 for accessing alternative categorization services. In another embodiment, control module 260 may perform runtime optimizations, such as caching, so that subsequent requests do not have to incur a cost of a network lookup.

SGSN module 263 manages the communication between the web filtering components 261 and mobile device 212. Mobile device 212 and SGSN module 263 are typically interconnected via a base station subsystem (not shown). SGSN module 263 is also responsible for establishing communication with GGSN module 264. For example, SGSN module 263 may establish a Packet Data Protocol context with GGSN 264. GGSN 264 provides the interface between the wireless network used by mobile device 212 and external networks 290, such as the Internet or other private networks.

In an embodiment of the present invention for handling HTTP requests, web filter 265 is an HTTP proxy server that interconnects with a service control point and queries control module 260 to determine access restrictions. HTTP proxy server 265 intercepts, inspects, and processes web requests. Accordingly, HTTP proxy server 265 intercepts all HTTP requests and applies configuration and filter rules as defined by the primary user and maintained by control module 260. According to one embodiment, when an HTTP request is made to the HTTP proxy, a filter performs a reverse DNS lookup to find a phone number associated with an IP address. In a further embodiment, an LDAP query is used to find a phone number associated with an IP address. Using the phone number, the filter provided by the control module 260 looks up the set of allowed URL categories associated with that phone number. In a further embodiment, it may also look up the category of the URL using the third party categorization engine. It then checks if the URL's category is in the set of allowed URL categories based on the access restrictions received from the control module 260. From here it makes a decision whether to allow the HTTP request to pass through unrestricted or to redirect to another page.

AAA services module 266 provides authentication services for mobile devices and provides mapping information to directory service module 269. Accordingly, AAA services module 266 and directory service module 269 work together to provide directory information to control module 260. According to one embodiment, a lookup table with mobile device numbers associated with a given an IP address is provided and maintained by the directory service module 269. The AAA services module 266 populates the lookup table with IP/mobile phone mapping data. For example, in one embodiment, directory service module 269 provides an LDAP directory with a high performance scalable lookup and other application layer proxy services. In a further embodiment, directory service module 269 provides a DNS directory. The DNS approach is typically a light weight approach, while the LDAP approach provides a more generalized approach and also facilitates access to other application identity information such as email address, login id, instant messenger id etc. With the DNS approach, a carriers DHCP is setup to register a domain name based on the DHCP client id information sent by the mobile device. A fully-qualified name would then be registered in the DNS to include the mobile phone number. A reverse DNS lookup would then be used to find the fully-qualified name and extract the mobile phone number.

In operation, according to one embodiment of the present invention, mobile device 212, a device from within a primary user's group of mobile devices, is provisioned over-the-air via a base station subsystem (not shown) to connect to SGSN 263. The attributes that may be configured include the Access Point Name ("APN"), User Name, Password, Authentication Method, or Homepage. For a GSM network a mobile phone APN would then resolve to a GGSN 264. The AAA service module 266 then authenticates the mobile device 212. Upon authentication, RADIUS accounting records are retrieved from AAA service module 266 and populate the directory server 269 with IP/Mobile Phone mapping data.

For example, in a GSM network data flow for a mobile device attempting to access Web data, according to an embodiment of the present invention, begins with the device establishing an entry point by sending a PDP Context Activate Request to SGSN module 263. SGSN module 263 then sends a Create PDP Context Request to GGSN module 264. GGSN module 264 sends an Access Request to a RADIUS proxy of the AAA services module 266 and in return GGSN module 264 receives an Access Accept from the RADIUS proxy. GGSN module 264 then provides an Accounting Start Request to RADIUS proxy and a CREATE PDP Context Response to SGSN module 263. SGSN module 263 then sends an Activate PDP Context Accept to mobile device 212. Meanwhile, RADIUS proxy registers the device's mobile number with directory service module 269 and provides an Accounting Response to GGSN module 264. Directory service module 269 then forwards a data message to mobile device 212.

According to one embodiment, GGSN module 264 includes filter rules to route HTTP traffic to HTTP proxy server 265. Thus, mobile devices will point to a proxy server transparently, without the need for device configuration. In a further embodiment, GGSN module 264 may connect to a proxy server configured on mobile device 212. In either embodiment, all HTTP requests are then intercepted and queried against the configuration data for mobile device 212 maintained by control module 260. Control module 260 identifies mobile device 212 by looking up the IP address using the Directory 266.

Once a device has established a connection with the network, HTTP requests seeking access to Web data may be processed. For example, returning to the GSM example, the device forwards an HTTP Request to HTTP proxy server 265. HTTP proxy server 265 then forwards an Authorization Request to control module 260. Control module 260 forwards a Lookup Request to directory service 269, wherein the directory service 266 provides the control module 260 with the device's phone number.

In a further embodiment, control module 260 also sends a Request for URL Categories for the requested URL to a third-party content classification service 294 and receives the current list of categorizations for the requested URL. Control module 260 determines whether to allow or deny the requested URL based on the user's profile and sends either an Authorize or Deny Response to the HTTP proxy server 265. Based on the message from control module 260, the HTTP proxy server 265 will respond to the device with the requested URL or with a denial message.

According to the GSM example, to deactivate a session, mobile device 212 forwards a PDP Context Deactivate Request to the SGSN module 263. In response, the SGSN module 263 forwards a Delete PDP Context Request to the GGSN module 264. GGSN module 264 then forwards an Accounting Stop Request to the patrol RADIUS proxy on AAA services module 266 and a Delete PDP Context Response to SGSN module 263. The RADIUS proxy within AAA services module 266 forwards a request to deregister the mobile number from the directory module 269 and returns an Accounting Stop Response to GGSN module 264. SGSN module 263 terminates the session with a Deactivate PDP Context Accept message to mobile device 212.

Figure 2D:
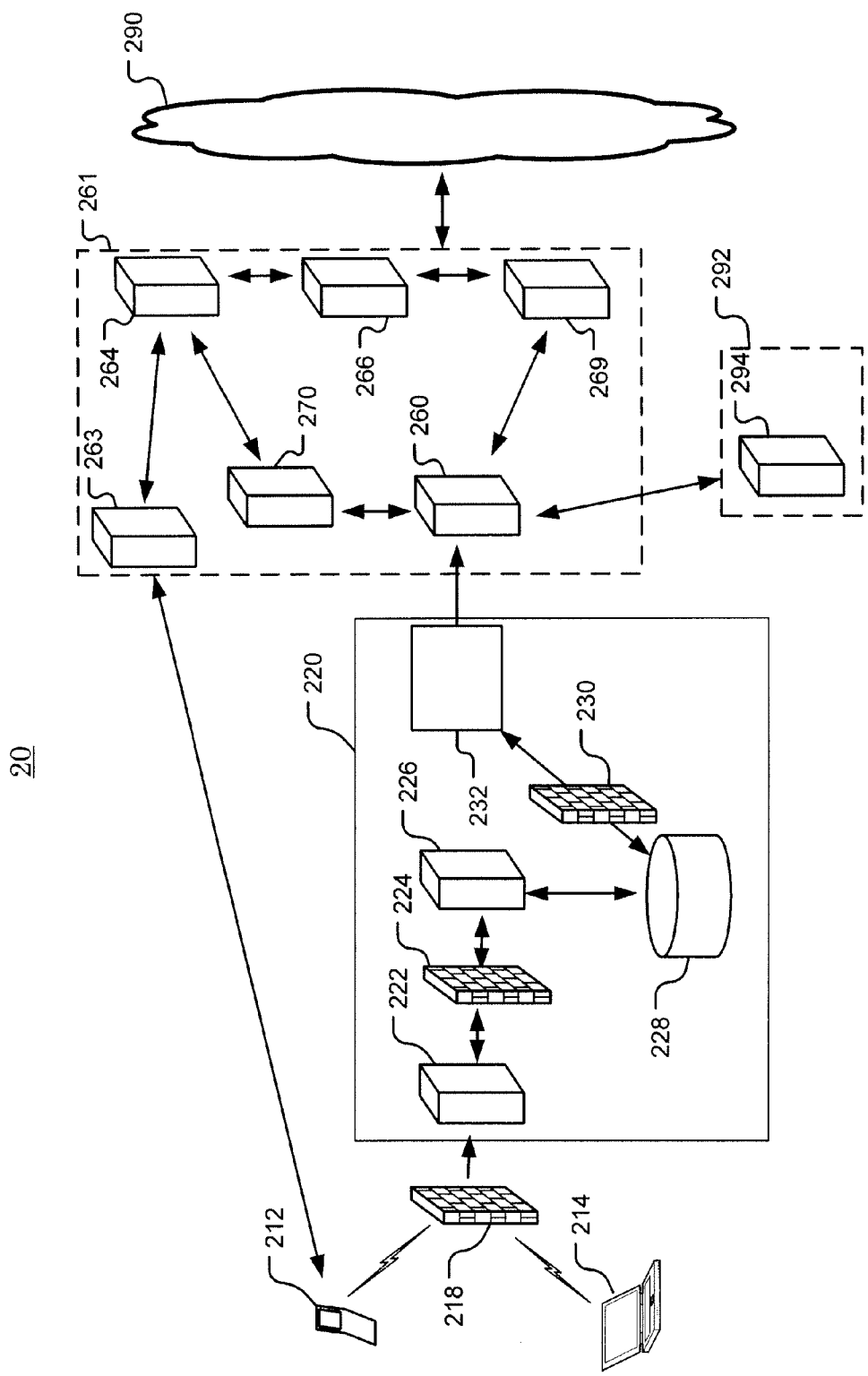
FIG. 2D shows a detailed view of a wireless application protocol ("WAP") trans-coding gateway web filter architecture for a consumer configurable mobile communications system, according to an embodiment of the present invention.

FIG. 2D shows a detailed view of a Wireless Application Protocol ("WAP") trans-coding gateway web filter architecture for a consumer configurable mobile communications system, according to an embodiment of the present invention. As with the web filter architecture shown in FIG. 2C, the web filtering components 261 of an embodiment of the present invention providing WAP trans-coding, as shown in FIG. 2D, include a control module 260, an SGSN module 263, a GGSN 264, an AAA services module 266, and a directory service module 269. The web filter module of the embodiment shown in FIG. 2*d* is a WAP gateway module 270.

Control module 260 is responsible for enforcing the policies defined by the service management module 232. Control module 260 may base its determination on several factors, as configured by a primary user, such as time of day, as well as the category of a URL to be accessed. Control module 260 may also be configured with a categorization interface for interconnecting with one or more content classification services 294 within a set of third-party service providers 292. In further embodiments, additional interfaces may be implemented for accessing alternative categorization services. In another embodiment, control module 260 may perform runtime optimizations, such as caching, so that subsequent requests do not have to incur a cost of a network lookup.

WAP gateway module 270 manages WAP requests for mobile device 212 based on the configuration of the device. Control module 260 indicates to the WAP gateway module 270 the WAP traffic to allow or deny. The WAP gateway module 270 then manages the WAP traffic according to the instructions from control module 260.

In operation, according to one embodiment, mobile device 212 connects to SGSN module 263 via a base station subsystem (not shown). The APN of mobile device 212 resolves to GGSN module 264. AAA services module 266 then authenticates mobile device 212. RADIUS Accounting records are retrieved from the AAA 266 and populate the directory service 269 with IP/Mobile Phone mapping.

In one embodiment, the GGSN module 264 may transparently route to the WAP gateway 270. In a further embodiment, GGSN module 264 connects to a WAP gateway (not shown) configured on mobile device 212. All WAP requests then traverse the WAP gateway and can be introspected and queried against control server 260.

Control module 260 identifies mobile device 212 by looking up the IP address using directory service module 269. In a further embodiment, control module 260 retrieves the classification of the content from the content classification service 294. Control module 260 determines if the user's profile is allowed to access the requested content and provides an instruction to the WAP gateway. The WAP gateway then allows the request to go through or redirects the request based on the response of the control module 260.

Figure 2E:
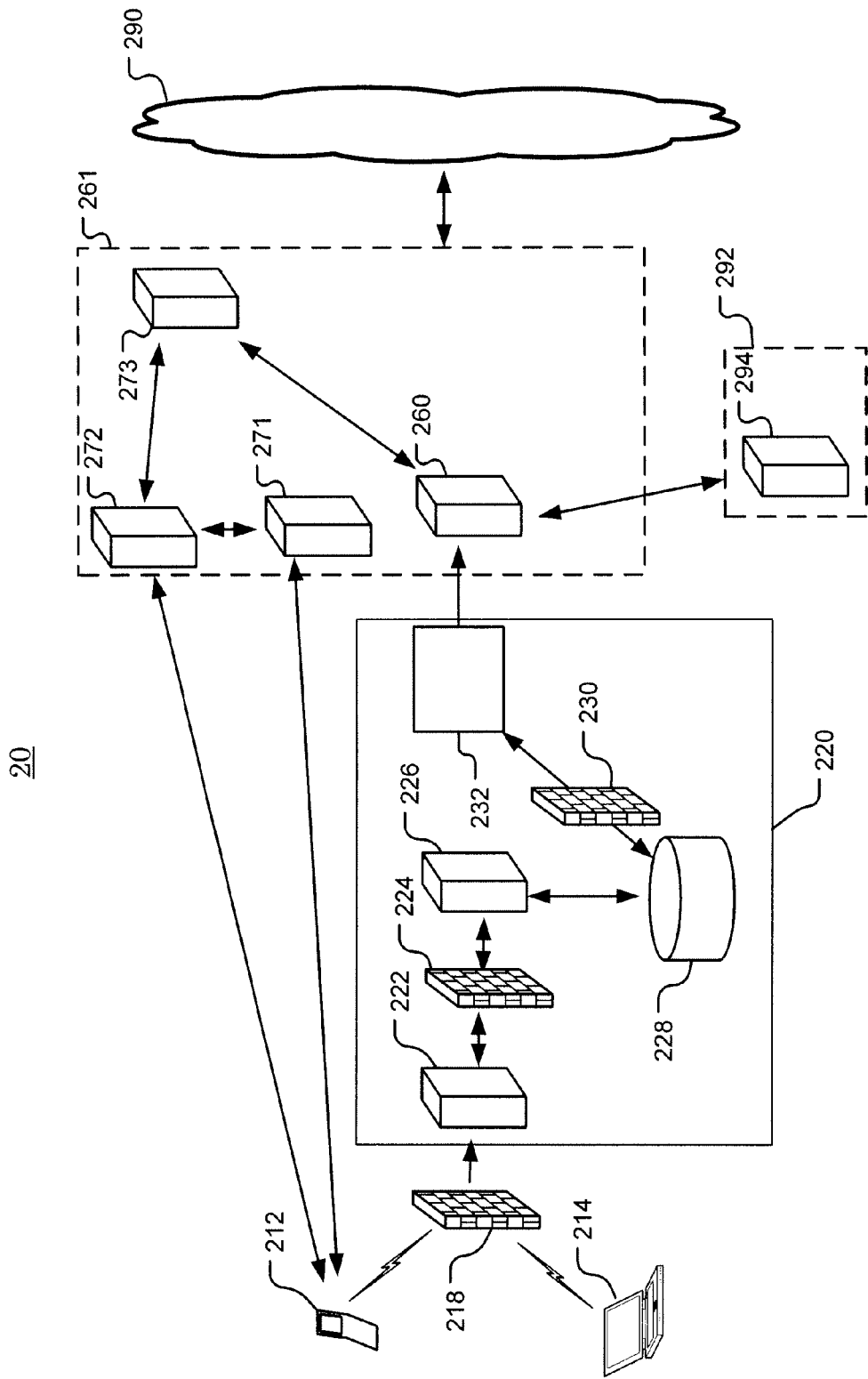
FIG. 2E shows a detailed view of a web filter architecture with short messaging service ("SMS") capabilities for a consumer configurable mobile communications system, according to an embodiment of the present invention.

FIG. 2E shows a detailed view of a web filter architecture with short messaging service ("SMS") capabilities for a consumer configurable mobile communications system, according to an embodiment of the present invention. The embodiment shown in FIG. 2E includes a control module 260, Visitor Location Register ("VLR") module 271, Mobile Switching Center ("MSC") module 272, and Short Message Service Center ("SMSC") module 273. According to the embodiment shown in FIG. 2E, VLR module 271 provides authorization to mobile device 212 and identifies the MSC module 272 to which mobile device 212 should connect. MSC module 272 identifies the SMSC module 273 to be used by querying VLR module 271. MSC module 272 then forwards the SMS message to the identified SMSC module 273 where the SMSC module 273 provides the filtering of the SMS message based on instructions from control module 260. Control module 260 indicates to SMSC module 273 whether or not the SMS message is allowed to be sent or not based on the configuration of mobile device 212.

In operation, mobile device 212 connects to VLR module 271 and requests authorization. In response, VLR module 271 returns a response to mobile device 212 identifying the MSC module 272 to which the call will be connected. Once connected with mobile device 212, MSC module 272 queries VLR module 271 to identify which SMSC module 273 to use. The MSC module 272 then forwards the SMS message to the identified SMSC module 273. In this manner all SMS message are intercepted and the SMSC module 273 queries each message against the policy server 260 to determine whether or not the mobile device is allowed to deliver or receive the intercepted message. To make this determination, control module 260 identifies mobile device 212 based on the originating phone number.

Control module 260 may also dynamically classify the content of the SMS message using content classification service 294. Control module 260 determines whether the user's profile is allowed to access the requested content and sends a message with that determination to SMSC 273. Based on the control module's determination, the SMSC 273 allows the message to be sent or received, or blocks it.

FIG. 2F shows a detailed view of a web filter architecture with multimedia messaging service ("MMS") capabilities for a consumer configurable mobile communications system, according to an embodiment of the present invention. The web filtering components 261 of the embodiment shown in FIG. 2F include control module 260, SGSN module 263, GGSN module 264, Multi-Media Messaging Service Center ("MMSC") module 274, and Home Location Register ("HLR") module 275. MMSC module 274 provides filtering capabilities based on instructions from control module 260. HLR module 275 provides detailed information regarding the mobile devices authorized to use the network, such as mobile device 212.

In operation, mobile device 212 connects to the SGSN 263 via a base station subsystem (not shown). The mobile device Access Point Name ("APN") resolves to a specified GGSN 264. In one embodiment, the GGSN 264 transparently routes to MMSC 274. In a further embodiment, GGSN 264 connects to an MMSC server gateway (i.e. MMS URL) configured on mobile device 212.

All MM1 messages received by the MMSC 274 are introspected and queried against control module 260. The control module 260 identifies the user based on the originating phone number, as retrieved from HLR module 275. In a further embodiment, the control module 260 dynamically classifies the content using content classification service 294. The control module 260 determines if the user's profile is allowed to access the content of the MM1 message based on the configuration for mobile device 212 and/or classifications provided by content classification service 294. The MMSC 274 then sends or blocks the message based on instructions from control module 260.

Figure 2G:
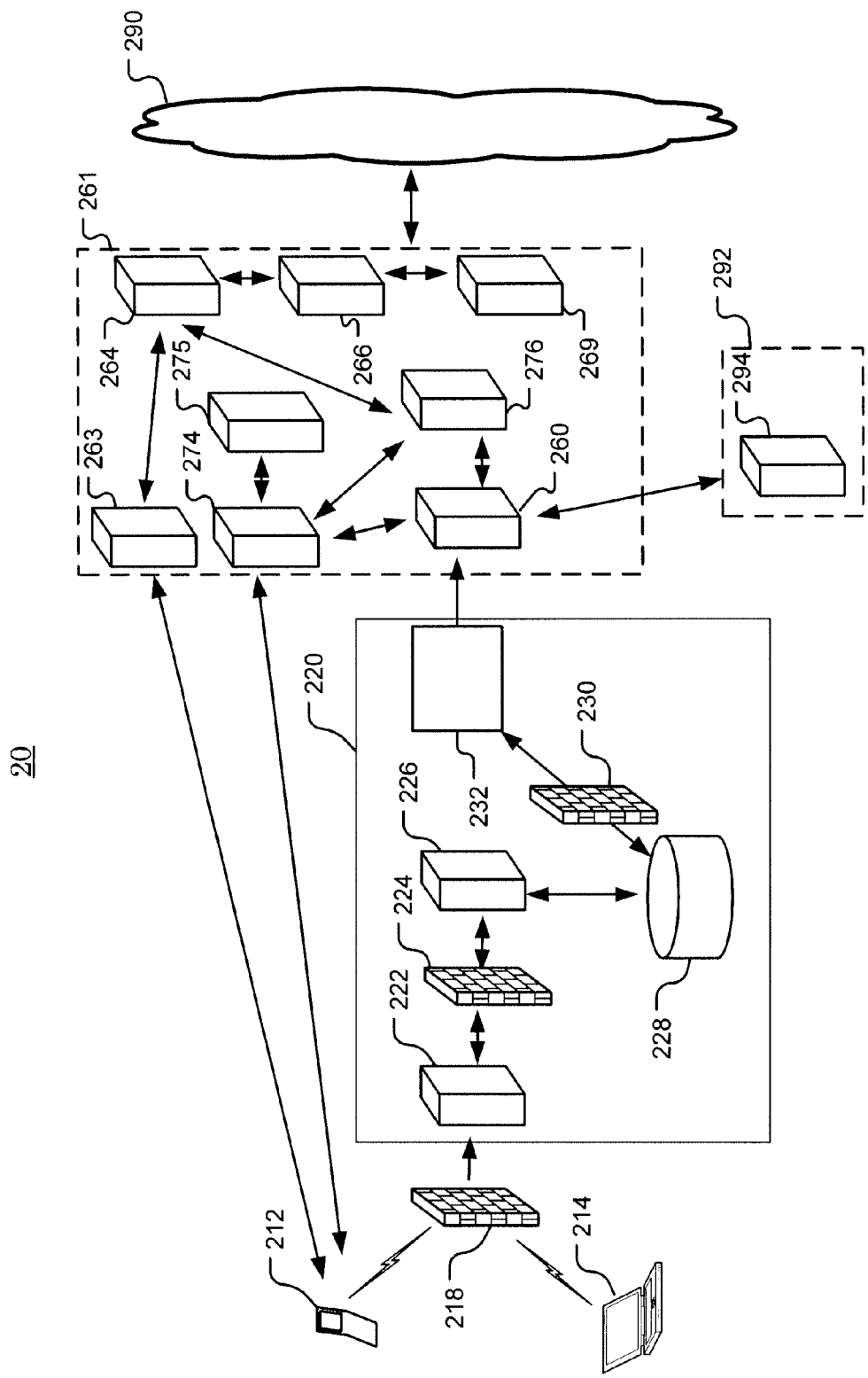
FIG. 2G shows a detailed view of a web filter architecture with MMS via a proxy capabilities for a consumer configurable mobile communications system, according to an embodiment of the present invention.

FIG. 2G shows a detailed view of a web filter architecture with MMS via a proxy capabilities for a consumer configurable mobile communications system, according to an embodiment of the present invention. The web filtering components 261 of the embodiment shown in FIG. 2G include control module 260, SGSN module 263, GGSN module 264, AAA services module 266, directory service module 269, MMSC module 274, HLR module 275, and WAP gateway module 276.

In operation, mobile device 212 connects to the SGSN 263 via a base station subsystem (not shown). Via the SGSN 263, the APN for mobile device 212 resolves to a GGSN 264. AAA server 266 authenticates mobile device 212. RADIUS accounting records are retrieved from AAA 266 and populate directory module 269 with an IP/Mobile phone mapping.

In one embodiment, GGSN 264 transparently routes to WAP gateway 276. In a further embodiment, GGSN 264 connects to a WAP gateway configured on the mobile device 212. All WAP requests then traverse the WAP gateway and can be introspected and queried against control module 260.

Control module 260 identifies mobile device 212 by looking up the IP address within directory module 269. In a further embodiment, control module 260 also retrieves the classification of the content from the content classification service 294. Control module 260 then determines whether or not the user's profile allows mobile device 212 to access the requested content. If content is allowed by the control module 260, the WAP gateway is instructed to allow the request to be sent on the MMSC 274. If the content is not allowed, the WAP gateway blocks the content.

Figure 2H:
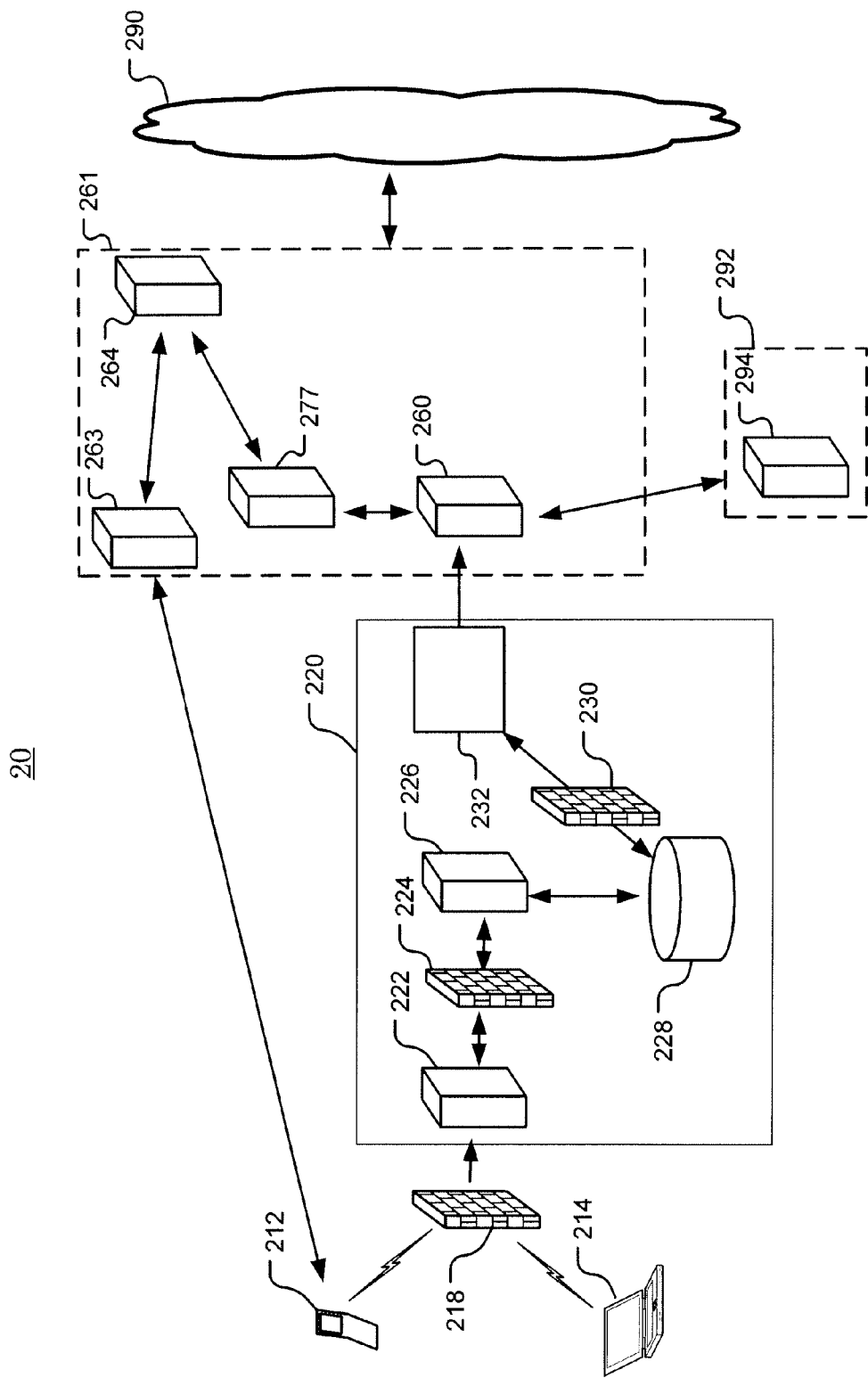
FIG. 2H shows a detailed view of a web filter architecture with instant messaging ("IM") capabilities for a consumer configurable mobile communications system, according to an embodiment of the present invention.

FIG. 2H shows a detailed view of a web filter architecture with instant messaging capabilities for a consumer configurable mobile communications system, according to an embodiment of the present invention. The web filtering components 261 of the embodiment shown in FIG. 2H include control module 260, SGSN module 263, GGSN module 264, and IM gateway module 277. IM gateway module 277 provides filtering capabilities based on instructions from control module 260.

In operation, mobile device 212 connects to the SGSN 263 via a base station subsystem (not shown). The APN of mobile device 212 resolves to a GGSN 264. An IM mobile client application residing on mobile device 212 then connects to the IM gateway 277 as configured on the mobile phone. All IM messages are then handled and queried against control module 260. Control module 260 identifies the user with the user name used by the IM mobile client. In a further embodiment, control module 260 retrieves classification of the content from the content classification service 294. Control module 260 then determines if the user's profile allows access to the requested content. Control module 260 then instructs the IM gateway 277 whether to allow or block the IM message. The IM gateway 277 will then allow or deny the IM message to be sent based on the response of the control module 260.

Figure 2I:
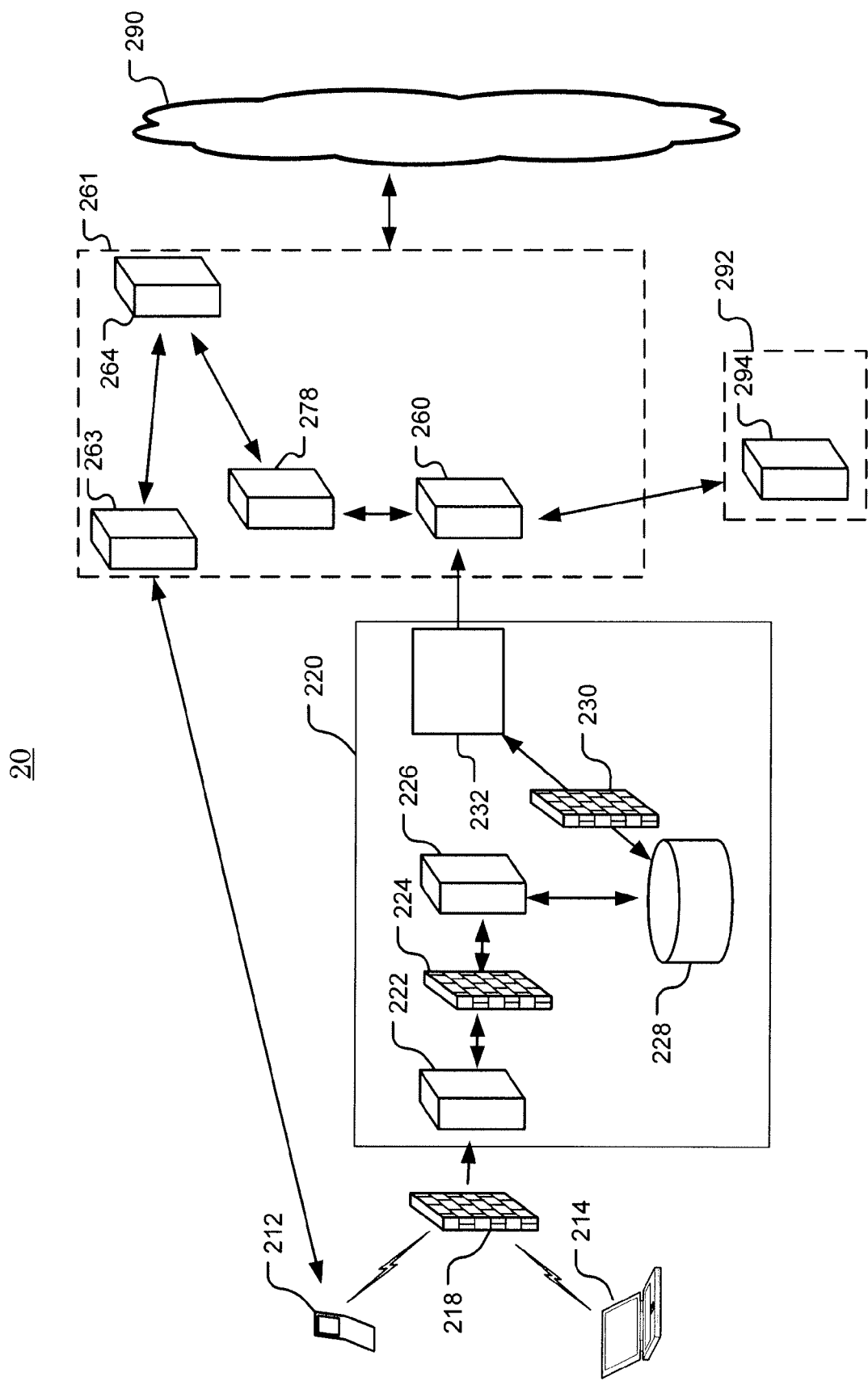
FIG. 2I shows a detailed view of a web filter architecture including e-mail capabilities for a consumer configurable mobile communications system, according to an embodiment of the present invention.

FIG. 2I shows a detailed view of a web filter architecture including e-mail capabilities for a consumer configurable mobile communications system, according to an embodiment of the present invention. The web filtering components 261 of the embodiment shown in FIG. 2I include control module 260, SGSN module 263, GGSN module 264, and mail module 278. E-mail module 278 provides the filter capabilities for e-mail content based on instructions from control module 260.

In operation, mobile device 212 connects to the SGSN 263 via a base station subsystem (not shown). The APN for mobile device 212 resolves to a GGSN 264. The GGSN 264 routes SMTP/POP3/IMAP traffic to e-mail module 278 as configured on an email client for mobile device 212. All e-mail is handled by the e-mail module 278. All SMTP requests to send email and all POP3/IMAP requests to retrieve e-mail undergo inspection and are queried against the control module 260. Control module 260 identifies the user based on the email address in the message requests. In a further embodiment, control module 260 retrieves dynamic classification of the content from the content classification service 294. Control module 260 then determines if the user's profile is allowed to access the requested content and forwards a response to mail module 278 indicating how to process the email. E-mail module 278 then allows the email to be sent or retrieve, or blocks the email based on the response from the control module 260.

Figure 3:
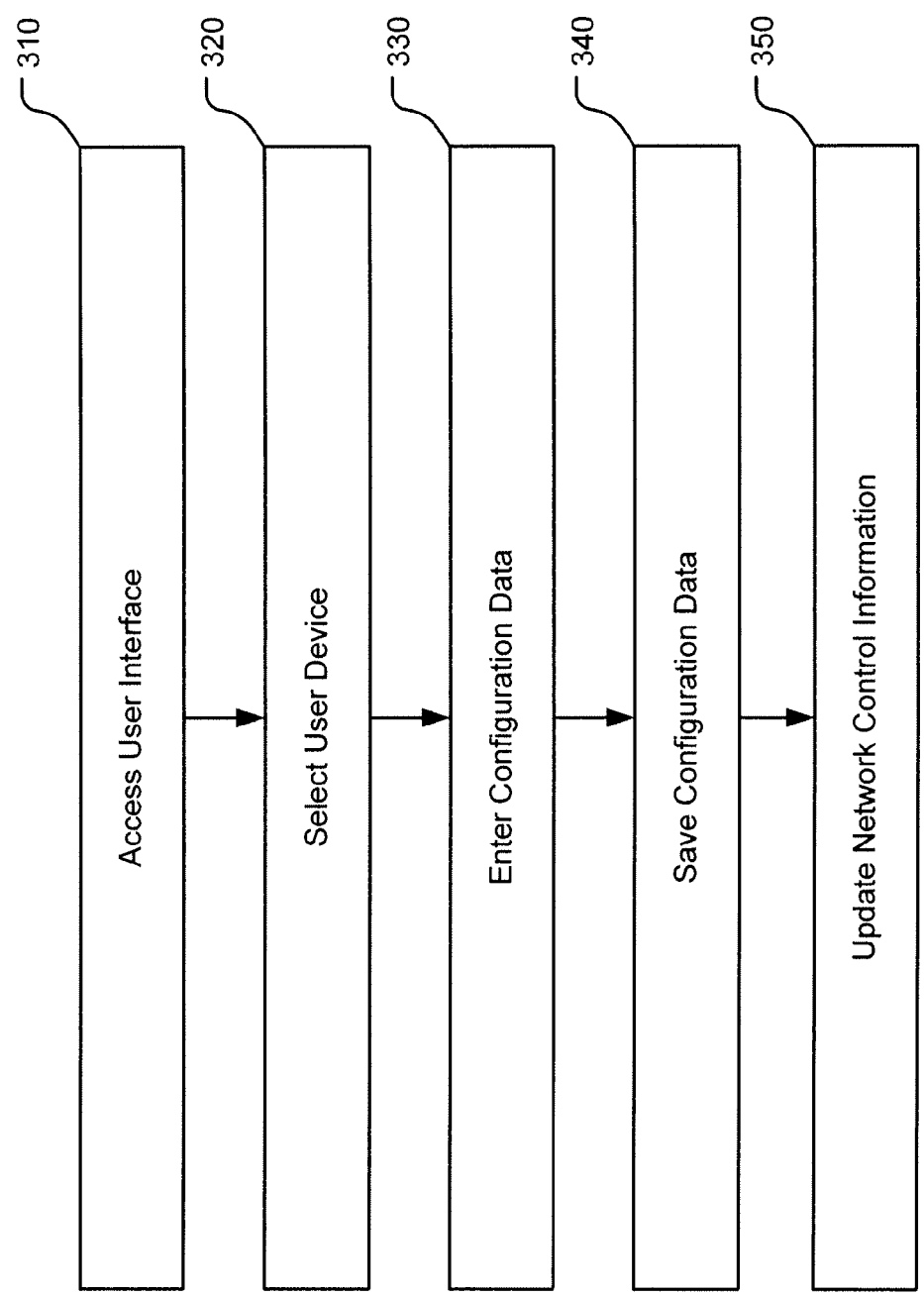
FIG. 3 shows a process flow diagram for configuring a mobile communications user account, according to an embodiment of the present invention.

FIG. 3 shows a process flow diagram for configuring a mobile communications device, according to an embodiment of the present invention. In FIG. 3, a primary user configures a device within a mobile communications account beginning in step 310 by accessing a user interface presented by the mobile communications system. In step 320, a device is selected from available devices. In step 330, configuration information is entered for the selected device. According to an embodiment of the present invention, configuration information may include, for example, phone numbers that the device may always call or never call, phone numbers with specific times that the selected device may call or receive calls from, the time of day or time of week the selected device may be used to make or receive calls from specific numbers, or access to additional services, such as text messaging or Internet access.

After configuration information is entered, the configuration information is saved in step 340. Once the information is saved in step 340 configuration or control data is created and updated in step 350. After the control data has been updated, the user device functions according to the configuration information entered by the primary user for that device.

Figure 4:
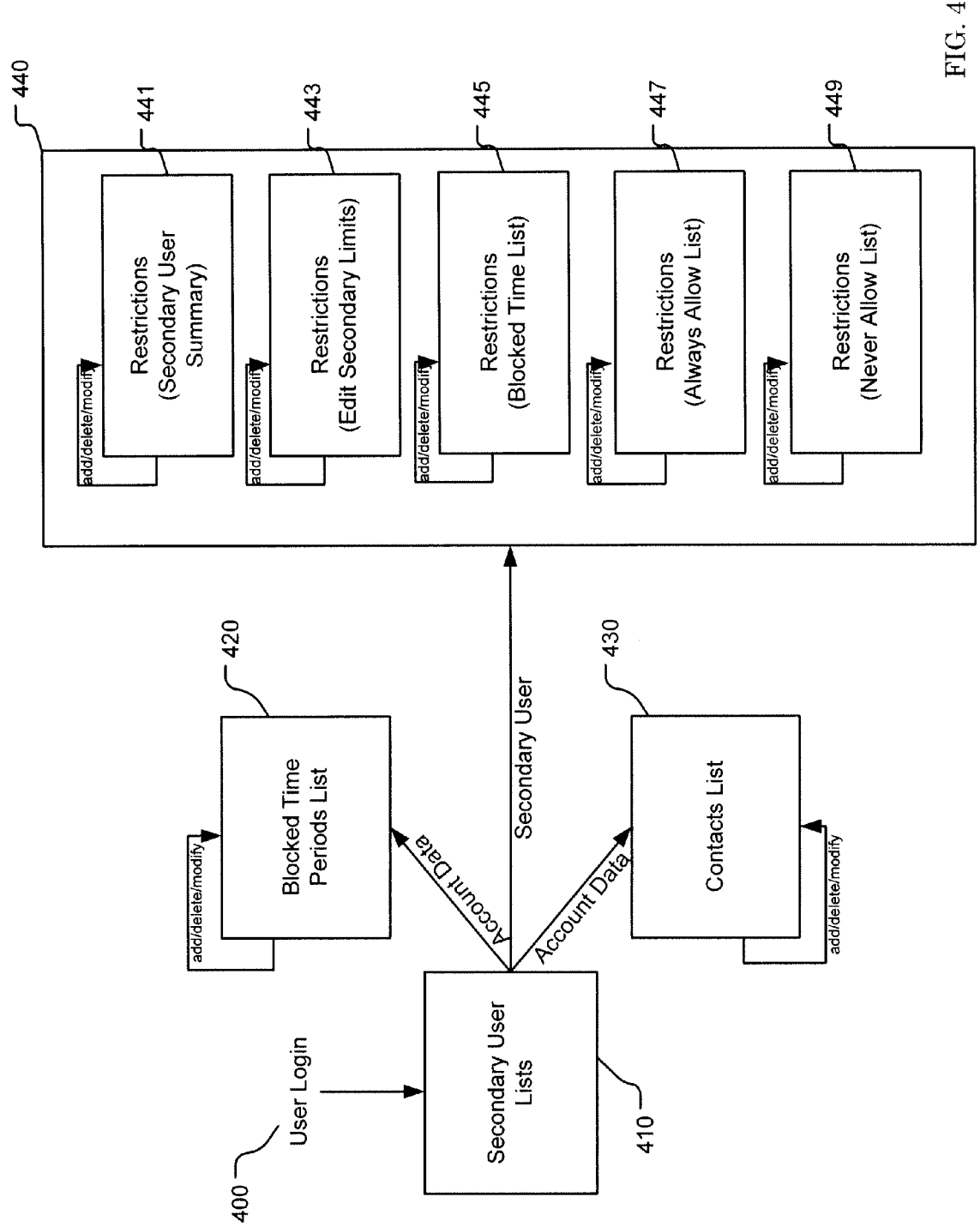
FIG. 4 shows a detailed flow diagram for configuring restrictions for a secondary user account, according to an embodiment of the present invention.

FIG. 4 shows a detailed flow diagram for configuring restrictions, according to an embodiment of the present invention. Configuration begins with a primary user logging in at step 400. At step 410, a secondary user list is provided identifying the secondary users within the account. At step 420, a blocked time periods list is provided where the primary user may add, delete, or modify time periods that may be applicable to one or more secondary users. At step 430, a contacts list is provided where the primary user may add, delete, or modify contact information that may be applicable to restrictions that may be applicable to one or more secondary users.

From the list of secondary users provided at step 410 a primary user may select a user for adding, modifying, or deleting restrictions at step 440. According to the embodiment shown in FIG. 4, the step of adding, modifying, or deleting restrictions may include a secondary user summary step 441, an edit secondary limits step 413, a blocked time list step 445, an always all list step 417, and a never allow list step 449. At secondary user summary step 441, the primary user may review the current setting applied to a selected secondary user. At step 441, the primary user may also add, delete, or modify any of the available settings by selecting a particular setting for modification. At edit secondary limits step 413, the primary user may add, delete, or modify the number of allowed minutes of use for the selected secondary user. A time frame, such as one week or one month may also be designated, as well as a day of the week or month to indicate when the number of minutes should be reset.

At blocked time list step 415, the primary user may add, delete, or modify time periods in which the secondary user may not user their device for specified contacts. According to one embodiment, time periods are selected from the list of blocked time periods created at step 420.

At always allow list step 417, the primary user may add, delete, or modify a list of contacts that may always be called. According to one embodiment, contacts are selected from the list of contacts created at step 430.

At never allow list step 419, the primary user may add, delete, or modify a list of contacts that may never be called. According to one embodiment, contacts are selected form the list of contacts created at step 430.

Figure 5:
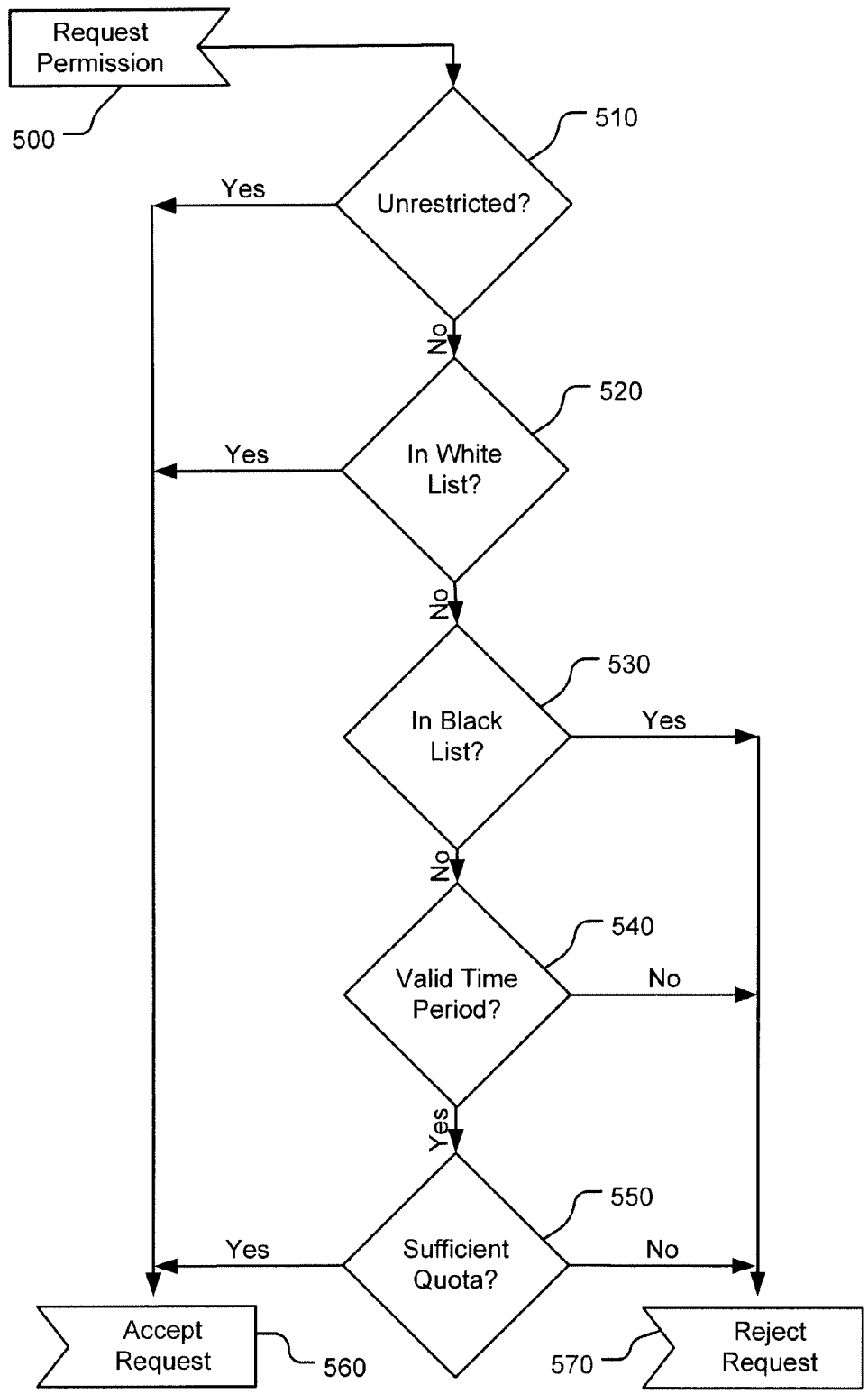
FIG. 5 is a flow diagram showing restriction precedence according to an embodiment of the present invention.

FIG. 5 is a flow diagram showing restriction precedence according to an embodiment of the present invention. The restriction precedence shown in FIG. 5 indicates the order in which restriction checks are made by a device configured according to an embodiment of the present invention. The restriction check begins at step 500 when a request for permission is made. At step 510, the configuration is checked to determine if the current configuration is set to an unrestricted state. If the device is currently set to an unrestricted state the process moves to step 560 where the request is accepted. If the device is not currently set to an unrestricted state, the process moves to step 520.

At step 520, the white or always allowed list is checked to determine if the request indicates a contact identified within the list. If the requested contact is identified on the white list, the process moves to step 560 where the request is accepted. If the contact is not identified on the white list, the process moves to step 530.

At step 530, the black or always deny list is checked to determine if the request indicates a contact identified within the list. If the requested contact is identified on the black list, the process moves to step 570 where the request is denied. If the contact is not identified on the black list, the process moves to step 540.

At step 540, the restricted time periods list is checked to determine if the request is being made during a valid time period. If the request is not being made during a valid time period, the process moves to step 570 where the request is denied. If the request is being made during a valid time period, the process moves to step 550.

At step 550, the remaining allotment of minutes is checked to determine if the device has a sufficient quota of time remaining. If there is a sufficient amount of time remaining, the process moves to step 560 where the request is accepted. If there is not a sufficient amount of time remaining, the process moves to step 570 where the request is rejected.

While various network and technology-based examples have been provided, the present invention is intended to be a network- and technology-agnostic application and is operable in a mobile carrier's network independent of the technology deployed. It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

What is claimed is:

1. A consumer configurable mobile web communications system comprising:

a patrol module adapted to receive configuration information from a primary user, store the configuration information in a patrol database, and forward configuration data based on the configuration information received from the primary user upon updates to said configuration information, said configuration information and data defining rules for restricting web communications over a mobile telecommunications network by one or more mobile devices associated with one or more secondary users;

a subsystem of web filtering components associated with said mobile telecommunications network and interconnected with the patrol module, said web filtering components including a control module adapted to receive and to store said configuration data forwarded by said patrol module, a web filtering module connected to means for enabling wireless access to web content by said mobile communication devices, said control module communicating with said web filtering module to cause said web filtering module to apply said stored configuration data to manage web communications to and from said mobile devices of said secondary users according to appropriate ones of said rules, and a directory service and authentication module in electronic communication with said control module, said directory service and authentication module adapted to maintain a real-time database mapping permanent telephone numbers of said mobile devices to current internet protocol addresses assigned to said mobile devices;

wherein said web filtering components manage said web communications for a given secondary user by identifying mobile web communication requests made by said given secondary user by mapping an internet protocol address for a given mobile device associated with said given secondary user, using said internet protocol address to lookup a mobile telephone number for said given secondary user, and said control module using said telephone number to identify appropriate ones of said rules, and said web filtering module implementing instructions from said control module regarding whether to permit said identified mobile web communication requests.

2. The system of claim 1, wherein said directory service and authentication module maintains a database that links a known permanent mobile telephone number for each said secondary user with a current internet protocol address being used for mobile web communications.

3. The system of claim 1, wherein said web filtering decisions are based upon one or more mechanisms selected from the group consisting of a lookup process that returns an MSISDN/MDN in response to an internet protocol address, a process that intercepts, inspects, and processes all outbound HTTP requests, and a process that determines a category for all requested URLs.

4. The system of claim 1, wherein said web filter module is an HHTP proxy server that interconnects with a service control point and queries said control module to determine whether a given mobile web communication for a given mobile device is permitted according to said rules.

5. The system of claim 1, wherein said means for enabling wireless access comprises a serving GPRS support node server in communication with a gateway GPRS support node server, said support node servers providing access to the Internet for said mobile devices, and wherein said web filtering module comprises a proxy server for said support node servers.

6. The system of claim 5, wherein the serving GPRS support node server is interconnectable with the mobile devices via a base station subsystem.

7. The system of claim 1, wherein the control module further comprises a categorization interface for interconnecting with a content classification service and retrieving classification data for content related to said web communications.

8. The system of claim 7, wherein the control categorization interface retrieves standard classification data.

9. The system of claim 7, wherein the control categorization interface retrieves custom classification data.

10. The system of claim 7, wherein the control module is further adapted to perform runtime optimizations comprising caching of the classification data to avoid subsequent requests and reduce a network lookup cost.

11. The system of claim 1, wherein said web filtering module is operably interconnected with a control point, wherein the web filtering module intercepts, inspects, and processes requests made by the each mobile device and queries the control module for access restrictions for associated secondary users.

12. The system of claim 1, wherein the web filtering components further comprise a WAP gateway module operably interconnected with said control module, wherein the WAP gateway module manages WAP requests for the mobile devices by allowing or denying WAP traffic based on instructions received from the control module, and wherein said directory service and authentication module provides authentication services for the mobile devices for each said secondary user, said directory services and authentication module adapted to maintain mapping information for said mobile devices and provide said control module with access to the mapping information to identify particular secondary users associated with a particular one of said mobile devices by looking up an internet protocol address for the particular mobile device from the mapping information.

13. The system of claim 1, wherein the web filtering components further comprise:
   a visitor location register (VLR) module for interconnecting with said mobile devices and providing authorization to said mobile devices;
   a mobile switching center (MSC) module for interconnecting with the mobile devices upon authorization by the VLR module and transmitting short message service (SMS) messages with the mobile devices;
   a short message service center (SMSC) module operably interconnected with the MSC module and the control module, wherein the MSC module forwards each SMS message to the SMSC module and the SMSC queries against the control module to determine if an associated one of said mobile devices is allowed to deliver or receive said each SMS message.

14. The system of claim 1, wherein the web filtering components further comprise:
   a multimedia messaging service center (MMSC) module operably interconnected with the means for enabling wireless access and the control module, said MMSC adapted to introspect a multimedia message and query against the control module to determine if a particular one of said mobile devices is allowed to access the content of a multimedia message; and
   a home location register (HLR) interconnected with the MMSC module for identifying the particular mobile device, wherein the control module retrieves an originating phone number from the home location register for identifying the secondary user for each multimedia message.

15. The system of claim 1, wherein the web filtering components further comprise an instant message gateway module interconnected with the means for enabling wireless access and the control module for receiving an instruction from the control module and filtering an instant message according to the instruction.

16. The system of claim 1, wherein the web filtering components further comprise an e-mail module interconnected with the means for enabling wirelessly accessing web content and the control module for receiving an instruction from the control module and filtering an e-mail message according to the instruction.

17. The system of claim 1, wherein said control module stores said configuration data in a database, and is further adapted to store records of network traffic of said secondary users for later review by said primary users.

18. The system of claim 1, wherein said primary users may activate an unrestricted setting for a particular secondary user that temporarily disables rules that pertain to said particular secondary user.

19. The system of claim 1, further comprising a media module in communication with said control module, said media module adapted to provide notices to a primary user according to one or more notice mechanisms predefined by said primary user, and further comprising a provisioning module adapted to forward notices describing attempted network traffic of said secondary users that violates said rules.

20. A method for configuring and controlling the use of mobile web communications device operable over a mobile telecommunications network, said method comprising:
- presenting a patrol system having a patrol module, and a subsystem of web filtering components associated with said mobile telecommunications network and interconnected with the patrol module, said web filtering components including a control module adapted to receive and to store said configuration data forwarded by said patrol module, a web filtering module connected to means for enabling wireless access to web content by said mobile communication devices, and a directory service and authentication module in electronic communication with said control module;
- receiving configuration information from a primary user via an interface of said patrol module;
- storing the configuration information in a patrol database of said patrol module;
- creating configuration data based on the configuration information whenever updates to said configuration information are made, said configuration data defining rules readable by said control module for restricting mobile web communications by one or more secondary users over the mobile telecommunications network;
- communicating said configuration data to said control module;
- storing said configuration data at said control module;
- mapping an internet protocol address for a given mobile device associated with each said given secondary user with a mobile telephone number assigned to said given mobile device;
- intercepting mobile web communication requests made to said means for enabling wireless access by each secondary user; and
- applying said stored configuration data with said web filtering module and said means for enabling wireless access to manage network web traffic to and from said secondary users according to said rules, said directory service and authentication module using said internet protocol address to lookup a mobile telephone number for said given secondary user and using said telephone number to identify appropriate ones of said rules in said patrol database.

* * * * *